(12) United States Patent
Bang et al.

(10) Patent No.: US 9,732,844 B2
(45) Date of Patent: Aug. 15, 2017

(54) TRANSMISSION APPARATUS

(71) Applicant: ADVANCED INSTITUTES OF CONVERGENCE TECHNOLOGY, Suwon-si, Gyeonggi-do (KR)

(72) Inventors: Young Bong Bang, Seoul (KR); Soon Wook Hwang, Seoul (KR)

(73) Assignee: ADVANCED INSTITUTES OF CONVERGENCE TECHNOLOGY, Suwon-si, Gyeonggi-Do (KR)

( * ) Notice: Subject to any disclaimer, the term of this patent is extended or adjusted under 35 U.S.C. 154(b) by 422 days.

(21) Appl. No.: 14/390,789

(22) PCT Filed: Apr. 8, 2013

(86) PCT No.: PCT/KR2013/002914
§ 371 (c)(1),
(2) Date: Oct. 5, 2014

(87) PCT Pub. No.: WO2013/151402
PCT Pub. Date: Oct. 10, 2013

(65) Prior Publication Data
US 2015/0094186 A1   Apr. 2, 2015

(30) Foreign Application Priority Data

Apr. 6, 2012  (KR) .......................... 10-2012-0036282
Apr. 3, 2013  (KR) .......................... 10-2013-0036447

(51) Int. Cl.
*F16H 57/10*  (2006.01)
*F16H 3/66*  (2006.01)
*F16H 3/44*  (2006.01)

(52) U.S. Cl.
CPC .............. *F16H 57/10* (2013.01); *F16H 3/44* (2013.01); *F16H 3/663* (2013.01); *B60L 2240/486* (2013.01); *F16H 2200/0021* (2013.01); *F16H 2200/0034* (2013.01); *F16H 2200/2005* (2013.01)

(58) Field of Classification Search
CPC .................................... F16H 57/10; F16H 3/44
See application file for complete search history.

(56) References Cited

U.S. PATENT DOCUMENTS 4,077,282 A    3/1978  Kress

FOREIGN PATENT DOCUMENTS

KR    10-1997-0003592 B1    3/1997
KR    10-1998-0003012 A     3/1998
KR    10-1130079 B1          3/2012

*Primary Examiner* — Derek D Knight
(74) *Attorney, Agent, or Firm* — Revolution IP, PLLC

(57) ABSTRACT

Disclosed is a transmission apparatus comprising: a sun gear connected to the input terminal; a plurality of first planetary gears engaging with an outer surface of the sun gear; a second planetary gear which forms a concentric circle with each first planetary gear, and which is integrally formed with the first planetary gears; a first ring gear engaging with outer surfaces of the first planetary gears and connected to the output terminal; a second ring gear engaging with an outer surface of the second planetary gear; a cage for supporting rotary shafts of the first and second planetary gears such that the first and second planetary gears can revolve about the sun gear; and a brake member.

20 Claims, 19 Drawing Sheets

TRANSMISSION APPARATUS

CROSS REFERENCE TO PRIOR APPLICATIONS

This application is a National Stage Application of PCT International Patent Application No. PCT/KR2013/002914 filed on Apr. 8, 2013, under 35 U.S.C. §371, which claims priority to Korean Patent Application Nos. 10-2012-0036282 filed on Apr. 6, 2012, and 10-2013-0036447 filed on Apr. 3, 2013 which are all hereby incorporated by reference in their entirety.

BACKGROUND

The present invention relates to a transmission apparatus, and more particularly, to a transmission apparatus which includes a compound planetary gear set, and is capable of achieving a multi-stage variable-speed rotation with a simple structure and performing a stopping and opening operation.

Recently, in developing an electric vehicle, a development of an in-wheel driving system is proceeded to increase energy efficiency and an inner space of a vehicle body and to obtain a production cost-reduction effect according to modularization. An electric motor is more suitable for a driving of the vehicle due to speed-torque characteristics thereof, comparing with an engine. However, since energy efficiency thereof is deteriorated in low speed and high speed regions, there is a problem that, when the electric motor is operated in these regions, the efficiency is lowered, and heat is severely generated. Therefore, when a mechanical transmission apparatus is used with the motor, it is possible to increase performance of the electric vehicle. However, since the transmission apparatuses developed till now have a complicated structure, a large size and an axially long structure, it is difficult to be installed in a vehicle wheel together with the motor. In the case of the vehicle wheel, since it should perform a high torque low speed rotation and a low torque high speed rotation as well as a braking operation and an opening operation which allows a person to push the vehicle, there is another problem that, when an existing transmission apparatus is used, it is difficult to install the apparatus in the wheel.

SUMMARY OF THE INVENTION

The present invention is directed to providing a transmission apparatus which includes a compound planetary gear set, and thus is capable of having an uncomplicated and simple structure, improving use of a space due to a reduced size without an axially extending structure, and performing a multi-stage variable-speed rotation, a stopping operating, and an opening operation through the compound planetary gear set.

One aspect of the present invention provides a transmission apparatus which changes speed between an input terminal and an output terminal, including a sun gear connected to the input terminal; a plurality of first planetary gears engaged with the sun gear; a second planetary gear configured to form a concentric circle with each first planetary gear and integrally formed with the first planetary gears; a first ring gear engaged with the first planetary gears and connected to an output shaft; a second ring gear engaged with the second planetary gear; a cage configured to support rotary shafts of the first and second planetary gears and configured to form a concentric circle with output sides of the first and second planetary gears; and a brake member, wherein the brake member acts on the second ring gear and on the cage so as to control rotation of the second ring gear and rotation of the cage.

Preferably, according to one embodiment of the present invention, the brake member includes a first brake member configured to act on the second ring gear and a second brake member configured to act on the cage.

Preferably, according to one embodiment of the present invention, the brake member is a friction brake.

Preferably, according to one embodiment of the present invention, a sixth gear part is formed on an outer circumferential surface of the second ring gear, and a seventh gear part is formed on an outer circumferential surface of the cage, and the brake member includes a first brake member having an eighth gear part engaged with the sixth gear part and a second brake member having a ninth gear part engaged with the seventh gear part.

Preferably, according to one embodiment of the present invention, the first and second brake members include a rack gear having the eighth or ninth gear part, a spring configured to exert an elastic force to the rack gear, a guide rail configured to guide a displacement of the rack gear, a rotary shaft configured to serve as a rotation center of the guide rail, and a power transmission part configured to displace the rack gear.

Another aspect of the present invention provides a transmission apparatus which changes speed between an input terminal and an output terminal, including a first sun gear; a second sun gear having a rotary shaft overlapped with a rotary shaft of the first sun gear; a plurality of first planetary gears circumscribed and engaged with the first sun gear; a second planetary gear configured to form a concentric circle with each first planetary gear, and integrally formed with the first planetary gears, and circumscribed and engaged with the second sun gear; a first ring gear circumscribed and engaged with the first planetary gears; a second ring gear circumscribed and engaged with the second planetary gear; a cage configured to support rotary shafts of the first and second planetary gears such that the first and second planetary gears are revolved about the first and second sun gears; and a brake member, wherein one of the rotary shaft of the first sun gear, the rotary shaft of the second sun gear, the rotary shaft of the first ring gear, the rotary shaft of the second ring gear, and the rotary shaft of the cage is the input terminal, and another one is the output terminal, and the brake member acts on one or more of three rotary shafts except the input terminal and the output terminal so as to perform a gear changing operation, a gear stopping operation, and a gear opening operation.

Preferably, according to one embodiment of the present invention, the brake member includes a first brake member, a second brake member, and a third brake member, and each of the first brake member, the second brake member, and the third brake member acts on one of the rotary shaft of the first sun gear, the rotary shaft of the second sun gear, the rotary shaft of the first ring gear, the rotary shaft of the second ring gear, and the rotary shaft of the cage.

Preferably, according to one embodiment of the present invention, the gear changing operation is performed according as one of the first to third brake members acts on one of the rotary shafts, and the gear stopping operation is performed according as two or more of the first to third brake members act on the rotary shafts, and the gear opening operation is performed according as the first to third brake members do not act on the rotary shafts.

Preferably, according to one embodiment of the present invention, at least one of the first to third brake members is a friction brake.

Preferably, according to one embodiment of the present invention, a first gear part is formed at each rotary shaft except the input terminal and the output terminal, and at least one of the first to third brake members is a gear brake including a second gear part engaged with the first gear part to stop rotation of the rotary shaft.

Preferably, according to one embodiment of the present invention, the gear brake includes a rack gear having a gear part, a spring configured to exert an elastic force to the rack gear, a guide rail configured to guide a displacement of the rack gear, a rotary shaft configured to serve as a rotation center of the guide rail, and a power transmission part configured to displace the rack gear.

Preferably, according to one embodiment of the present invention, the first sun gear is connected with the input terminal, and one of the second sun gear, the first ring gear, and the second ring gear is connected with the output terminal; or the second sun gear is connected with the input terminal, and the second sun gear or the cage is connected with the output terminal; or the first ring gear is connected with the input terminal, and the first sun gear or the cage is connected with the output terminal; or the second ring gear is connected with the input terminal, and the first sun gear is connected with the output terminal; or the cage is connected with the input terminal, and the second sun gear or the first ring gear is connected, and thus when the brake member acts on any of the rest three rotary shafts, a rotation direction of the output terminal is not changed.

Preferably, according to one embodiment of the present invention, the first sun gear is connected with the input terminal, and the second ring gear is connected with the output terminal; or the first ring gear is connected with the input terminal, and the cage is connected with the output terminal; or the second ring gear is connected with the input terminal, and the first sun gear is connected with the output terminal; or the cage is connected with the input terminal, and the first ring gear is connected with the output terminal.

Still another aspect of the present invention provides a transmission apparatus which changes speed between an input terminal and an output terminal, including N gear stages arranged in a multi-stage manner (N>2); a cage; and a brake member, wherein each gear stage includes at least one of a sun gear and a ring gear, and a plurality of planetary gears, and the sun gear is disposed at a revolution center of the plurality of planetary gears, and the plurality of planetary gears are circumscribed and engaged with the sun gear, and the ring gear is inscribed and engaged with the plurality of planetary gears, and each sun gear included in the plurality of gear ages is coaxially disposed to have a separate shaft, and each planetary gear included in the plurality of gear stages is disposed to correspond to each other in each gear stage, and the plurality of planetary gears corresponding to each other in each gear stage form a concentric circle and are integrally formed with each other, and the cage supports rotary shafts of the planetary gears such that the planetary gears are revolved about the sun gear, and when one of the rotary shafts of the sun gears, the rotary shafts of the ring gears, and the rotary shaft of the cage is the input terminal, and another one is the output terminal, the brake member acts on one of other rotary shafts except the input terminal and the output terminal so as to change the speed.

Preferably, according to one embodiment of the present invention, diameters of the plurality of sun gears are different from each other.

Preferably, according to one embodiment of the present invention, the plurality of sun gears are arranged so that diameters thereof are increased or reduced, in turn, in an arrangement direction of the plurality of gear stages.

Preferably, according to one embodiment of the present invention, the brake member is a friction brake.

Preferably, according to one embodiment of the present invention, the brake member is a gear brake having a first gear part, and a second gear part engaged with the first gear part provided at the gear brake is formed at at least part of the cage, the ring gear, and the shaft of the sun gear.

Preferably, according to one embodiment of the present invention, the brake member includes a rack gear having the first gear part, a spring configured to exert an elastic force to the rack gear, a guide rail configured to guide a displacement of the rack gear, a rotary shaft configured to serve as a rotation center of the guide rail, and a power transmission part configured to displace the rack gear.

Preferably, according to one embodiment of the present invention, the brake member is a variable brake member displaced in an arrangement direction of the plurality of gear stages and configured to act on each gear stage.

Preferably, according to one embodiment of the present invention, a gear stopping operation is performed according as the brake member is applied to two or more of other rotary shafts except the input terminal and the output terminal, and a gear opening operation is performed as the brake member does not act on the rotary shafts.

Preferably, according to one embodiment of the present invention, the transmission apparatus further includes a second input shaft configured to act on one or more of the rest rotary shafts except the rotary shafts serving as the input terminal and the output terminal, and a speed of an output shaft is varied according as the second input shaft is rotated at a predetermined angular speed.

According to the present invention, since the transmission apparatus includes the compound planetary gear set, it is possible to have the uncomplicated and simple structure, improving use of the space due to the reduced size without the axially extending structure, and to perform the multi-stage variable-speed rotation, the stopping operating, and the opening operation through the compound planetary gear set.

DETAILED DESCRIPTION

Figure 1:
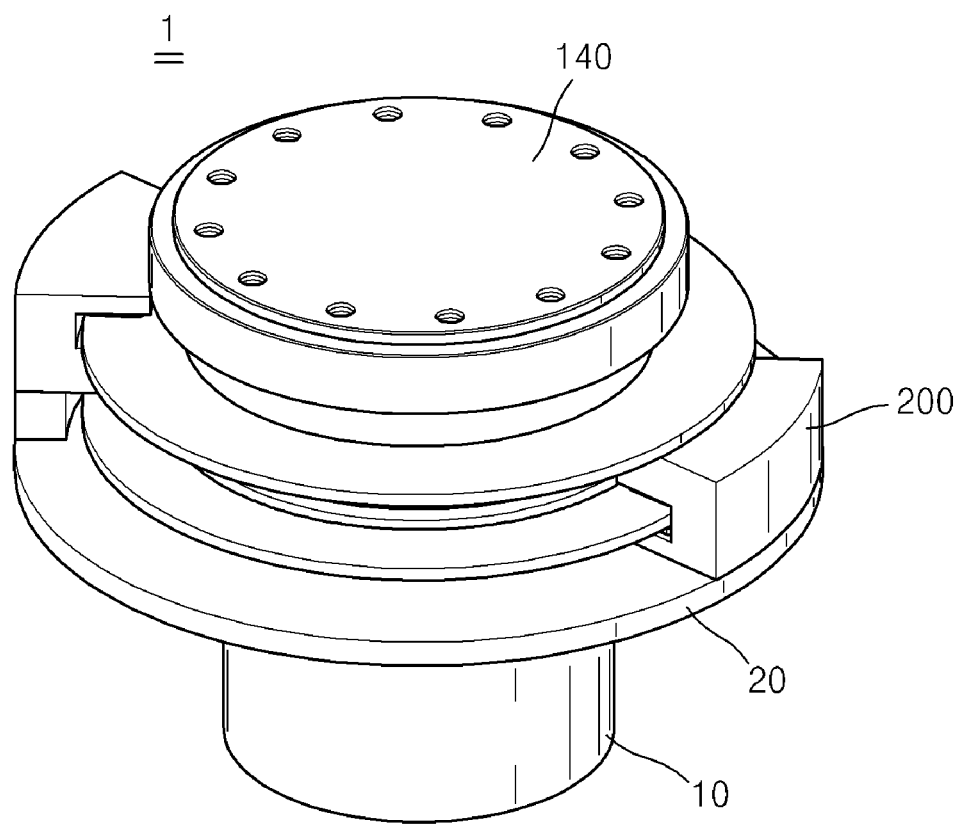
FIG. 1 is a view of a transmission apparatus according to one embodiment of the present invention.

In a transmission apparatus according to the present invention, which changes speed between an input terminal and an output terminal, the transmission apparatus includes a sun gear connected to the input terminal; a plurality of first planetary gears circumscribed and engaged with the sun gear; a second planetary gear configured to form a concentric circle with each first planetary gear and integrally formed with the first planetary gears; a first ring gear circumscribed and engaged with the first planetary gears and connected to the output terminal; a second ring gear circumscribed and engaged with the second planetary gear; a cage configured to support rotary shafts of the first and second planetary gears such that the first and second planetary gears are revolved about the sun gear; and a brake member, wherein the brake member acts on the second ring gear and the age so as to control rotation of the second ring gear and rotation of the cage.

Various advantages and characteristics of the present invention and methods will become apparent from the following detailed description of embodiments with the accompanying drawings. These inventive concepts may, however, be embodied in different forms and should not be construed as limited to the embodiments set forth herein. Rather, these embodiments are provided so that this disclosure is thorough and complete and fully conveys the inventive concept to those skilled in the art. The present invention is defined only by the scope of the claims. The same components are designated by the same reference numerals throughout the specification.

Spatially relative terms, such as "beneath," "below," "lower," "above," "upper" "side," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "above" other elements or features would then be oriented "below" or "beneath" the other elements or features. Thus, the term "upper" can encompass both an orientation of above and below. The device may be otherwise oriented (rotated 90 degrees or at other orientations), and the spatially relative descriptors used herein may be interpreted accordingly.

The terminology used herein is for the purpose of describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

In the drawings, sizes and shapes of construction elements shown in the drawings may be exaggeratedly or schematically illustrated, or omitted for the sake of convenience of explanation and clarity. Further, a size or surface area of each element is not entirely reflective of an actual size or surface area thereof.

Further, in the embodiments, a direction described in the description of the structure of the present invention is based on the drawings. In the description of the structure of the present invention, when a reference point and a position relationship of the direction are not clearly described, the related drawings will be referred.

Figure 2:
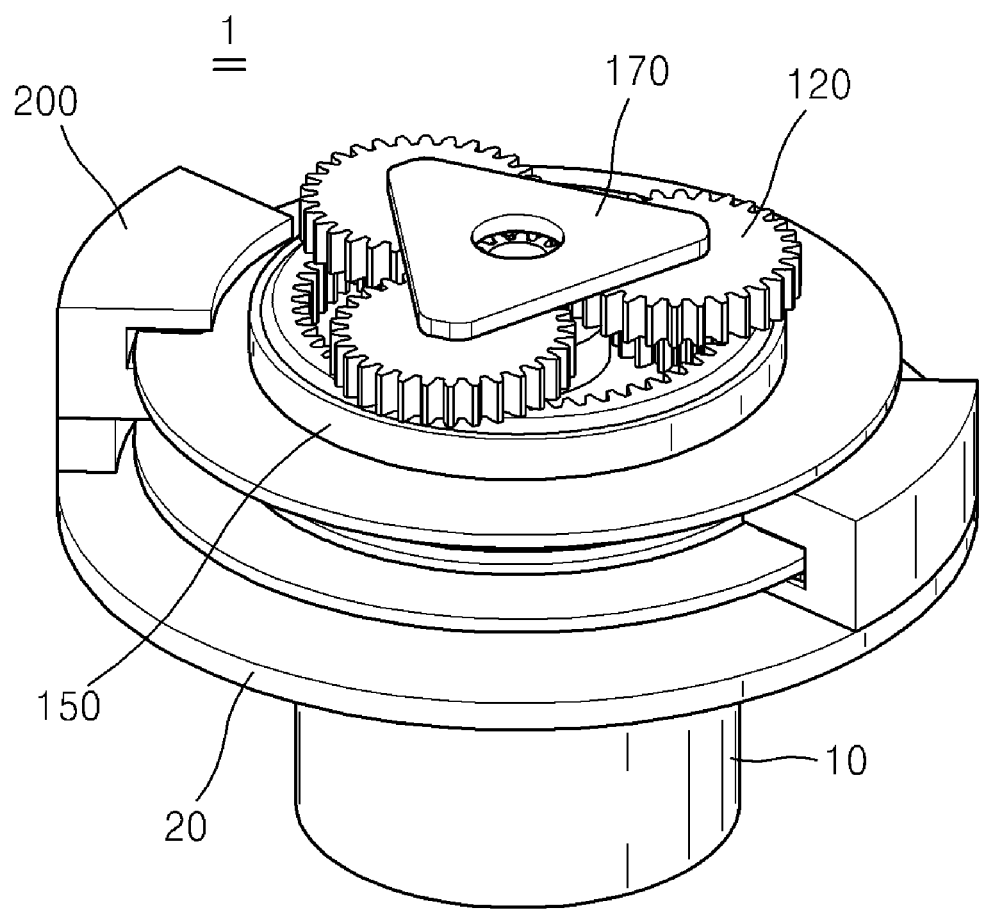
FIG. 2 is a view of the transmission apparatus according to one embodiment of the present invention.
Figure 3:
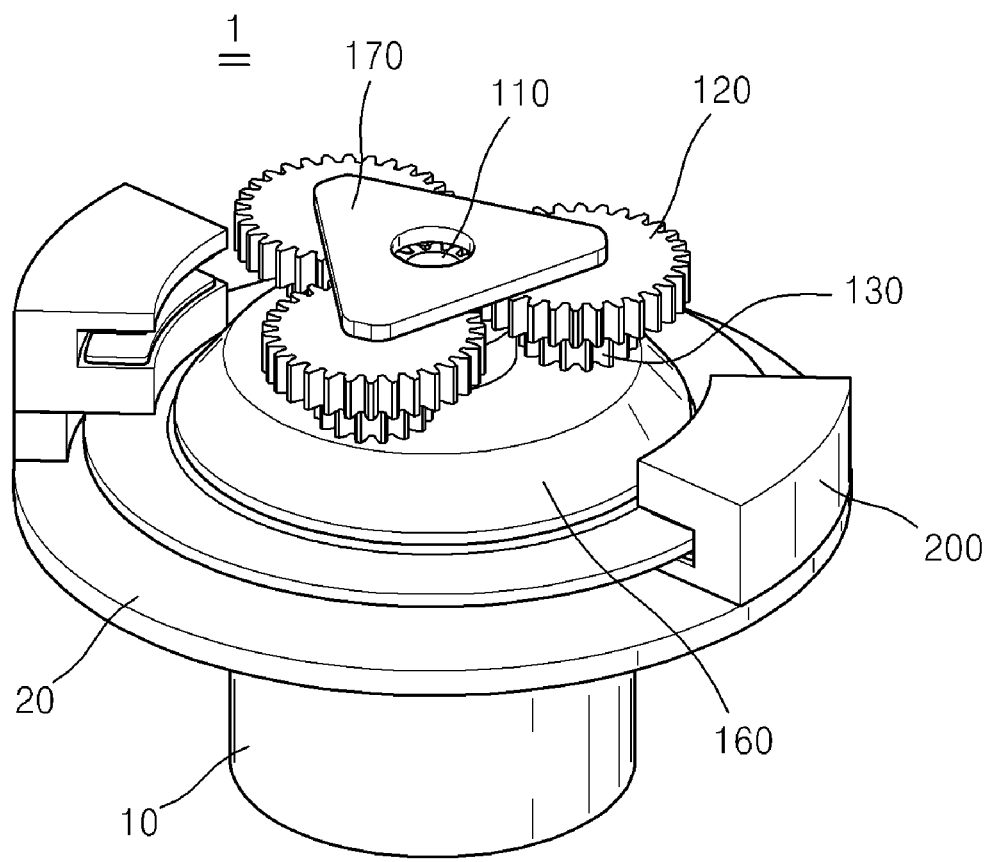
FIG. 3 is a view of the transmission apparatus according to one embodiment of the present invention.
Figure 4:
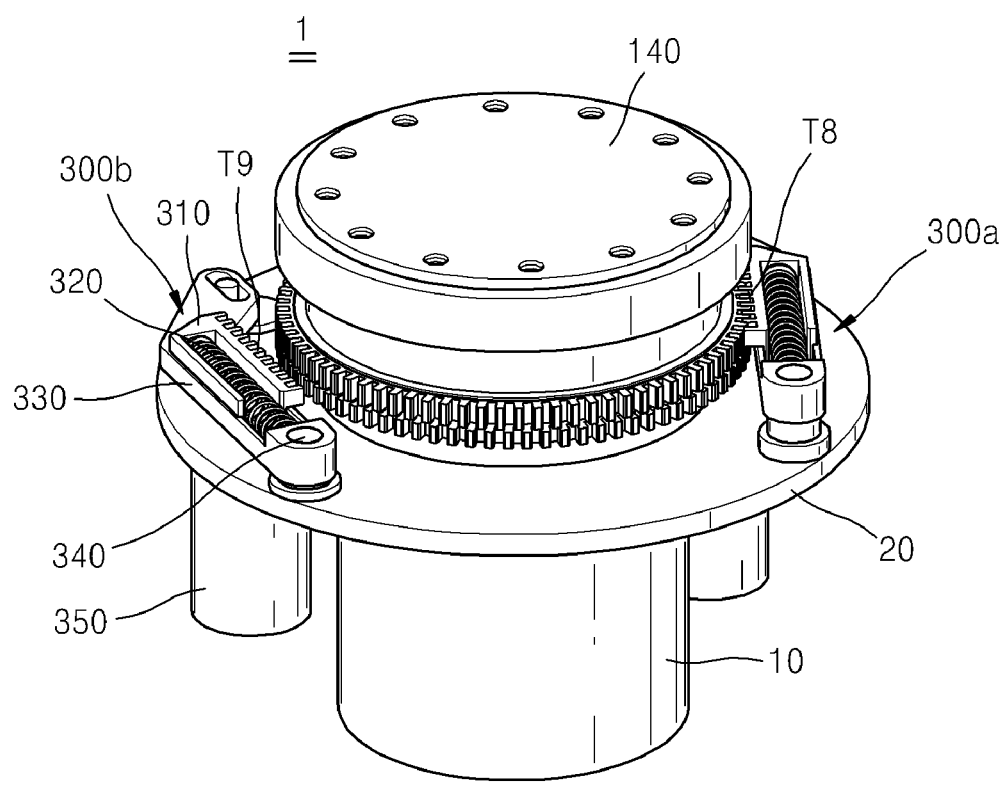
FIG. 4 is a view of the transmission apparatus according to one embodiment of the present invention.
Figure 5:
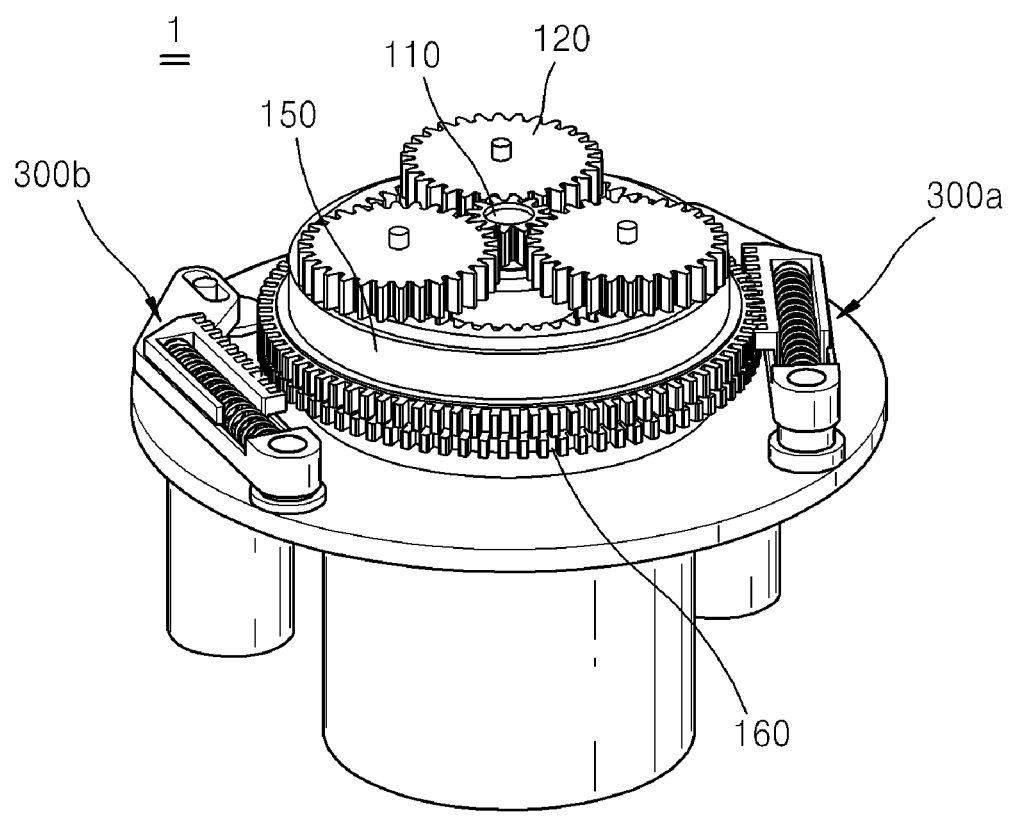
FIG. 5 is a view of the transmission apparatus according to one embodiment of the present invention.
Figure 6:
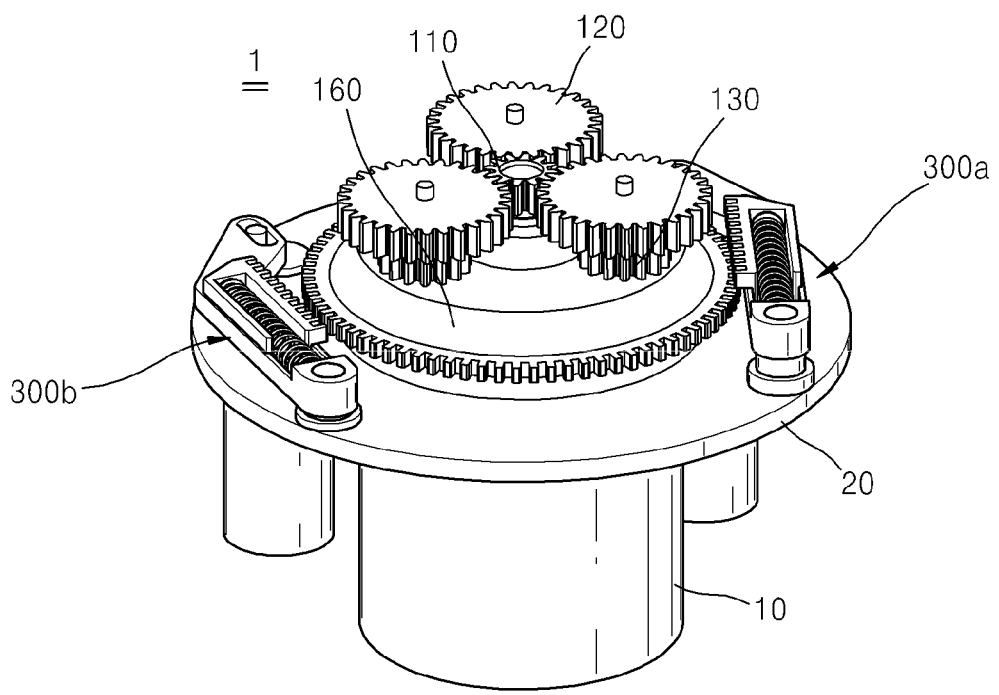
FIG. 6 is a view of the transmission apparatus according to one embodiment of the present invention.
Figure 7:
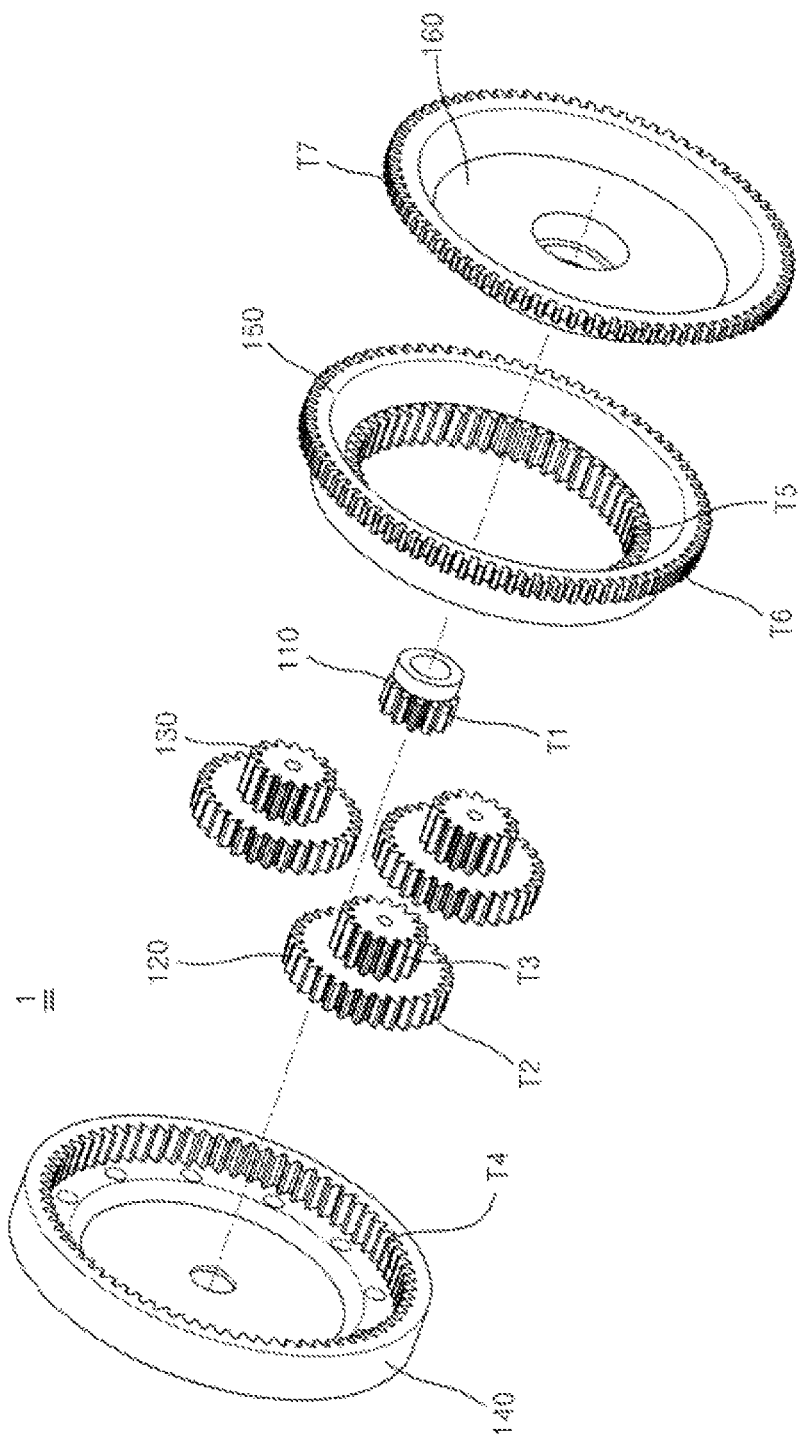
FIG. 7 is an exploded perspective view of the transmission apparatus according to FIGS. 4 to 6.

FIGS. 1 to 3 are views of a transmission apparatus according to one embodiment of the present invention, FIGS. 4 to 6 are views of a transmission apparatus according to another embodiment of the present invention, and FIG. 7 is an exploded perspective view of the transmission apparatus according to FIGS. 4 to 6.

Referring to FIGS. 1 to 7, the transmission apparatus 1 according to the present invention includes a sun gear 110 connected to an input terminal, a plurality of first planetary gears 120 engaged with the sun gear 110, a second planetary gear 130 configured to form a concentric circle with each first planetary gear 120 and integrally formed with the first planetary gears 120, a first ring gear 140 engaged with the first planetary gears 120 and connected to an output terminal, a second ring gear 150 engaged with the second planetary gear 130, a cage 160 configured to support rotary shafts of the first and second planetary gears 120 and 130 and concentrically configured with output sides of the first and second planetary gears 120 and 130, and a brake member.

The sun gear 110 is connected with an input terminal 10. For example, a rotary shaft of the sun gear 110 is connected with a rotary shaft of the input terminal to receive power from the input terminal 10. For example, the input terminal 10 may be a driving motor, but is not limited thereto. The sun gear 110 may be rotated by the power received from the input terminal 10. Meanwhile, a main frame 20 may be provided to install and support the transmission apparatus 1.

The first planetary gears 120 are engaged with the sun gear 110 to be rotated according to rotation of the sun gear 110. In FIGS. 1 to 7, three first planetary gears 120 are illustrated, but the present invention is not limited thereto. The plurality of first planetary gears 120 engaged with the Sun gear 110 may be disposed. The sun gear 110 is arranged among the plurality of first planetary gears 120. Thus, the sun gear 110 is inscribed about the plurality of first planetary gears 120, and the first planetary gears 120 are circumscribed about and engaged with the sun gear 110. Therefore, the sun gear 110 is disposed in a space among the plurality of first planetary gears 120 to apply a rotational force thereof to all of the first planetary gears 120.

The second planetary gear 130 shares the rotary shaft with each first planetary gear 120, and forms a concentric circle. That is, the number of the second planetary gears 130 is the same as that of the first planetary gears 120, and each first planetary gear 120 and each second planetary gear 130 share the rotary shaft with each other, and form the concentric circle together. Therefore, the first and second planetary gears 120 and 130 are rotated together and have the same angular speed.

Meanwhile, in FIGS. 1 to 7, the first and second planetary gears 120 and 130 are in contact and integrally formed with each other, but are not limited thereto. The first and second planetary gears 120 and 130 may be connected so as to be spaced from each other by a connecting means, such as a shaft (not shown), connects central axes of the first and second planetary gears 120 and 130, but are not limited thereto.

The first ring gear 140 is engaged with the first planetary gears 120, and configured to be rotated according to rotation of the first planetary gears 120. That is, the plurality of first planetary gears 120 are circumscribed about and engaged with the sun gear 110, and the ring gear 140 is circumscribed about and engaged with the plurality of first planetary gears 120. At this time, a rotation center axis of the first ring gear 140 may be overlapped with that of the sun gear 110.

Meanwhile, the first ring gear 140 is connected with an output terminal (not shown), and, for example, the output terminal may be connected with a rotary shaft of the first ring gear 140, which extends from the first ring gear 140, or may be connected with a belt connected with an outer circumference of the first ring gear 140, but is not limited thereto.

The second ring gear 150 is circumscribed about and engaged with the second planetary gears 130. The second ring gear 150 may be rotated according to rotation of the second planetary gears 130, and a rotational axis of the second ring gear 150 may be also configured to be overlapped with the rotational axes of the sun gear 110 and the first ring gear 140.

Preferably, as illustrated in FIGS. 1 to 7, a radius each first planetary gear 120 is formed to be greater than that of each second planetary gear 130. Therefore, a diameter of the first ring gear 140 circumscribed about the first planetary gears 120 may be formed to be greater than that of the second ring gear 150 circumscribed about the second planetary gears 130.

The cage 160 is disposed at lower ends of the second planetary gears 130 to support the rotary shafts of the first and second planetary gears 120 and 130. For example, the first and second planetary gears 120 and 130 may have desired shafts forming the rotational axes, and holes in which the shafts are rotatably inserted may be formed at the cage 160. Meanwhile, an upper cage 170 which supports the rotary shafts of the first and second planetary gears may be provided above the first planetary gears.

The cage 160 may have a rotational axis overlapped with the rotational axes of the sun gear 110, the first ring gear 140, and the second ring gear 150.

The cage 160 has the rotational axis overlapped with the rotational axis of the sun gear 110 and is formed to support the rotary shafts of the first and second planetary gears 120 and 130. The fore, when the first and second planetary gears 120 and 130 are revolved about the sun gear 110, the shafts serving as the rotational axes of the first and second planetary gears 120 and 130 are revolved about the sun gear 110, and thus the cage 160 may be rotated in the same direction as a revolution direction thereof.

According to the present invention, a brake member capable of stopping the rotation of the second ring gear 150 and the cage 160 is provided. That is, the brake member may stop the rotation of all of the second ring gear and the cage 160, may stop the rotation of one of the second ring gear 150 and the cage 160, or may not stop the rotation of all of the second ring gear 150 and the cage 160, and thus may allow all of the second ring gear 150 and the cage 160 to be rotated. Therefore, the brake member may include a first brake member acting on the second ring gear 150 and a second brake member acting one the cage.

For example, as illustrate in FIGS. 1 to 3, the brake member may be a friction brake 200. The friction brake 200 exerts a frictional force to each of the second ring gear 150 and the cage 160, and thus stops the rotation of the second ring gear 150 and the cage 160.

Meanwhile, for example, as illustrated in FIGS. 4 to 7, the brake member may be gear brakes 300a and 300b having gear parts T8 and T9.

As illustrated in FIG. 7, it may be understood that a first gear part T1 of the sun gear 110 is engaged with a second gear part T2 of the first planetary gears 120, and the first planetary gears 120 are circumscribed about the first ring gear 140, and the second gear parts T2 of the first planetary gears 120 are engaged with a fourth gear part T4 of the first ring gear 140.

Further, it may be understood that a third gear part T3 formed at the second planetary gear 130 is engaged with a fifth gear part T5 formed on an inner circumferential surface of the second ring gear 150, and sixth and seventh gear parts T6 and T7 are respectively formed on outer circumferential surfaces of the second ring gear 150 and the cage 160.

That is, the sixth and seventh gear parts T6 and T7 are respectively formed on the outer circumferential surfaces of the second ring gear 150 and the cage 160, and the gear brakes 300a and 300b having eighth and ninth gear parts T8 and T9 engaged the sixth and seventh gear parts T6 and T7 are provided, and as the gear parts T6, T7, T8 and T9 are engaged with each other, the rotation of the second ring gear 150 and the cage 160 may be stopped.

At this time, as illustrated in FIGS. 4 to 6, each of the gear brakes 300a and 300b may in include a rack gear 310 having the eighth and ninth gear parts T8 and T9, a spring 320 exerting an elastic force to the rack gear 310, a guide rail 330 guiding a displacement of the rack gear 310, a rotary shaft 340 serving as a rotation center of the guide rail 330, and a power transmission part 350 displacing the rack gear 310.

Meanwhile, the gear brakes 300a and 300b may include a first gear brake 300a acting on the second ring gear 150, and a second gear brake 300b acting on the cage 160. The first and second gear brakes 300a and 300b may be formed to have the same structure.

For example, when the second ring gear 150 is stopped by the first gear brake 300a, the power transmission part 350 displaces the rack gear 310, and the gear part T8 of the rack gear 310 is engaged with the sixth gear part T6 formed on the outer circumferential surface of the second ring gear 150. At this time, as the rack gear 310 is guided along the guide rail 330, the engagement between the rack gear 310 and the gear brake 300a may be achieved. Meanwhile, since each of the gear brakes 300a and 300b includes the spring 320 exerting an elastic force to the rack gear 310, the gear part formed at the rack gear 310 is engaged with the fifth gear part T5 formed at the second ring gear 150, and a shock generated when the rotation of the second ring gear 150 is stopped may be mitigated.

Since the brake member is included, when the brake member acts only on the second ring gear 150, the rotation of the second ring gear 150 is stopped, and the rotation of the cage 160 is not stopped, and revolution of the first and second planetary gears 120 and 130 are not interrupted, and thus the rotation and the revolution may be performed at the same time.

On the other hand, when the brake member acts only on the cage 160, the rotation of the cage 160 is stopped, and the revolution of the first and second planetary gears 120 and 130 are stopped, and thus only the rotation may be performed. Effects thereof will be described later.

Figure 8:
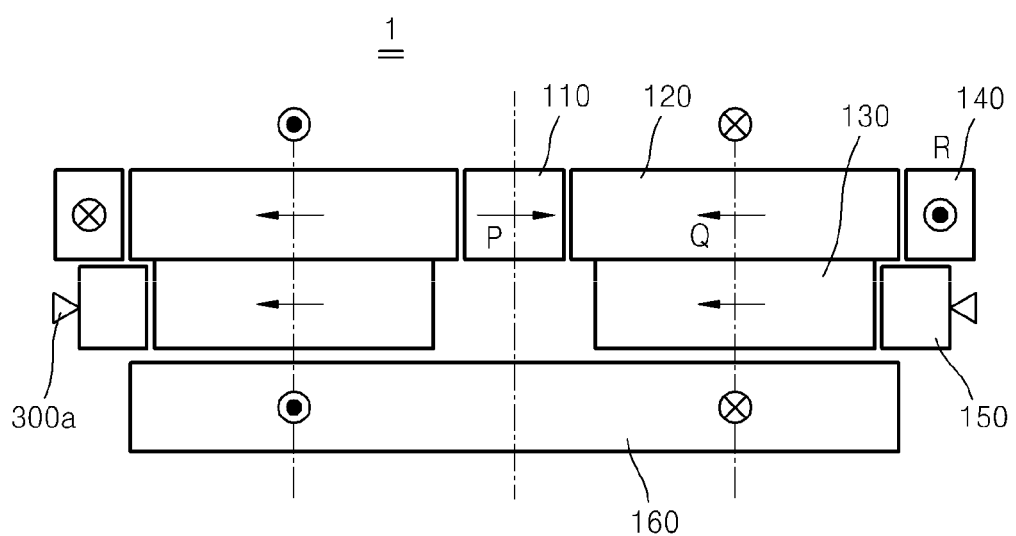
FIG. 8 is a view of an operation of the transmission apparatus according to one embodiment of the present invention.
Figure 9:
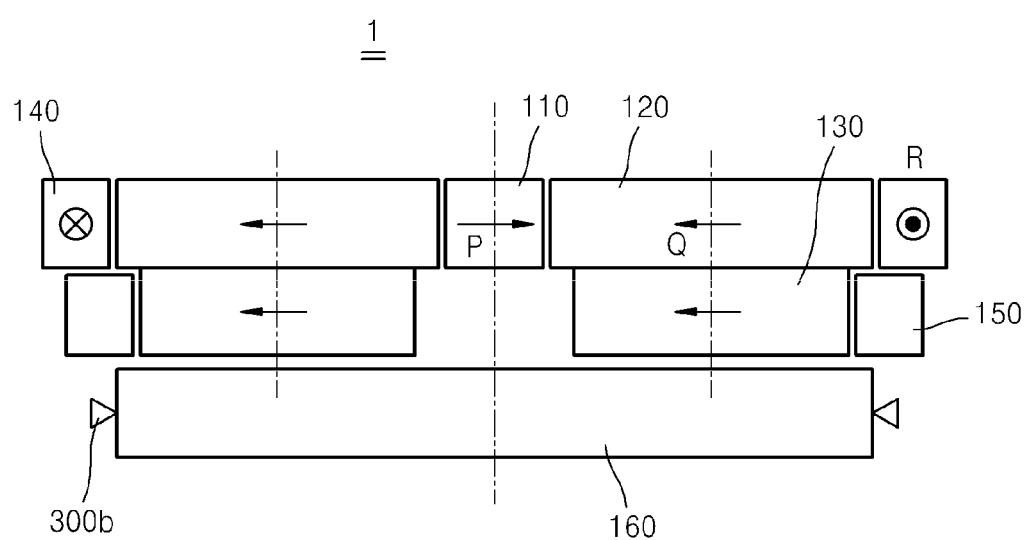
FIG. 9 is a view of the operation of the transmission apparatus according to one embodiment of the present invention.

FIGS. 8 and 9 are views illustrating an operation of the transmission apparatus 1 according to the present invention.

Hereinafter, the operation of the transmission apparatus according to the present invention will be described with reference to FIGS. 8 and 9.

FIG. 8 illustrates a state in which the brake member acts on the second ring gear 150 and does not act on the cage 160. Hereinafter, this state will be referred to as a "first gear state".

In the first gear state, as the brake member acts on the second ring gear 150, the rotation of the second ring gear 150 is stopped, and since the brake member does not act on the cage 160, the cage 160 may be rotated, and the revolution of the first and second planetary gears 120 and 130 are not interrupted, and thus the rotation and the revolution of the first and second planetary gears 120 and 130 are performed at the same time.

Meanwhile, the first ring gear 140 engaged with the first planetary gears 120 is also rotated by the rotation of the first planetary gears 120. At this time, a rotation direction of the first ring gear 140 is the same as a rotation direction of the first planetary gears 120, and is opposite to a rotation direction of the sun gear 110.

That is, as illustrated in FIG. 8, the rotation direction Q of the first planetary gears 120 is opposite to the rotation direction P of the sun gear 110. Further, since the brake member 300a does not act on the cage 160 and thus the rotation of the cage 160 is allowed, the first and second planetary gears 120 and 130 may be revolved. Meanwhile, the first ring gear 140 connected with the output terminal is also rotated. At this time, the rotation direction R of the first ring gear 140 is opposite to the rotation direction P of the sun gear 110.

FIG. 9 illustrates a state in which the brake member acts on the cage 160 and does not act on the second ring gear 150. Hereinafter, this state will be referred to as a "second gear state".

As the brake member acts on the cage 160, the rotation of the cage 160 is stopped, and thus positions of the rotational axes of the first and second planetary gears 120 and 130 are fixed. Therefore, the revolution of the first and second planetary gears 120 and 130 are stopped. Meanwhile, since the brake member does not act on the second ring gear 150 and thus the rotation of the second ring gear 150 is allowed, the second ring gear 150 is rotated by the rotation of the second planetary gear 130.

Meanwhile, the first ring gear 140 engaged with the first planetary gear 120 is also rotated. At this time, the rotation direction of the first ring gear 140 is the same as the rotation direction of the first planetary gears 120, and is opposite to the rotation direction of the sun gear 110.

That is, as illustrated in FIG. 9, the rotation direction Q of the first planetary gears 120 is opposite to the rotation direction P of the sun gear 110. Further, since the brake member 300b acts on the cage 160 and thus the rotation of the cage 160 is stopped, the revolutions of the first and second planetary gears 120 and 130 are also stopped. Meanwhile, the first ring gear 140 connected with the output terminal is also rotated. At this time, the rotation direction R of the first ring gear 140 is opposite to the rotation direction P of the sun gear 110.

As described above, in the first gear state, since the rotation and the revolution of the first planetary gears 120 engaged with the first ring gear 140 are performed at the same time, the first ring gear 140 has a first angular speed. In the second gear state, since only the rotation of the first planetary gears 120 engaged with the first ring gear 140 is performed, the first ring gear 140 has a second angular speed. At this time, due to a difference between the first angular speed and the second angular speed, the change of speed in the output terminal may be achieved.

That is, as the brake member is applied to the second ring gear or the cage, the change of speed is achieved, and an output direction of the output terminal may be maintained during the change of speed.

Further, by opening all of the brakes, the output terminal may be in a state capable of being freely rotated. If this is applied to a vehicle, it is possible to embody a state (a neutral gear state of the vehicle) in which the vehicle may be pushed by a person. Further, when the two brake members are applied, the gear may be converted into a stopping state.

The transmission apparatus according to the present invention includes a compound planetary gear set, and thus may have an uncomplicated and simple structure, and also may improve use of a space due to a reduced size without an axially extending structure. Further, it is possible to perform a multi-stage variable-speed rotation, a stopping operating, and an opening operation through the compound planetary gear set.

Figure 10:
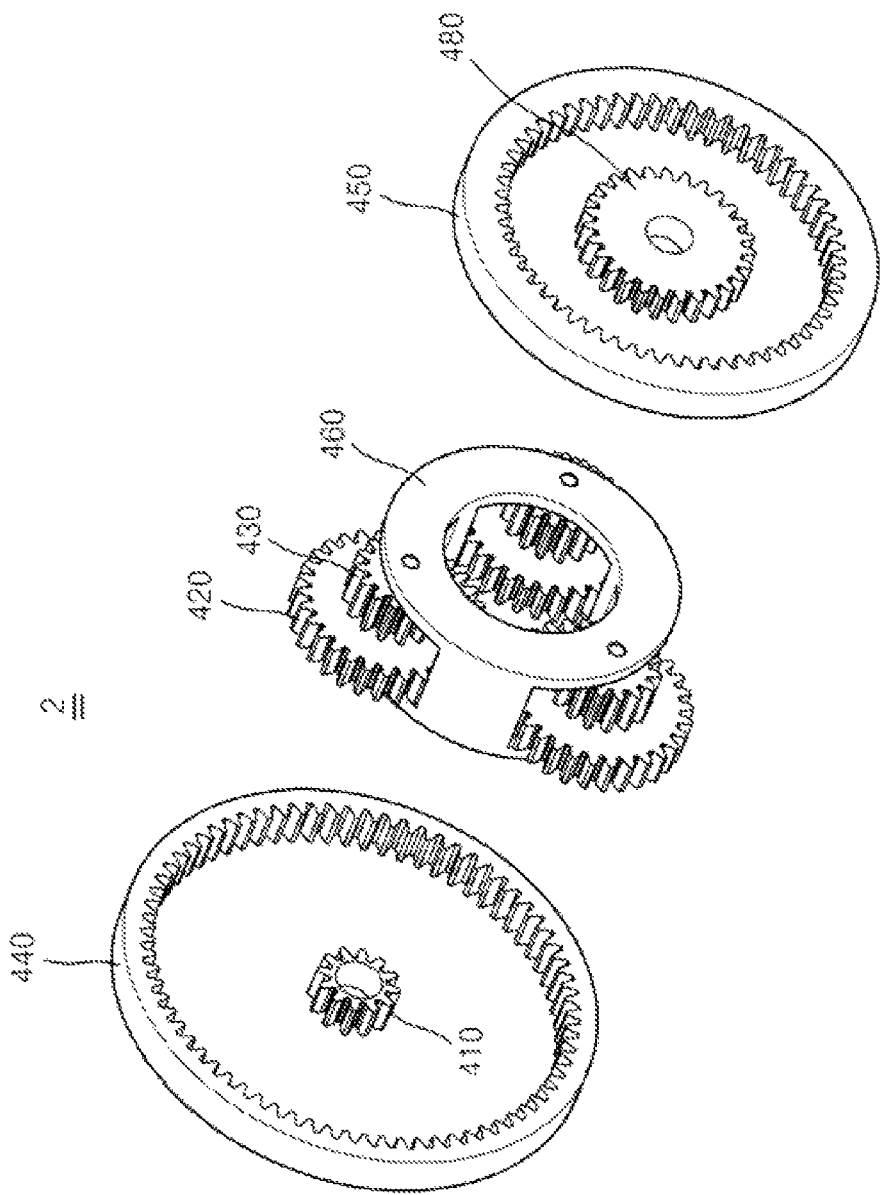
FIG. 10 is a view of the transmission apparatus according to one embodiment of the present invention.
Figure 11:
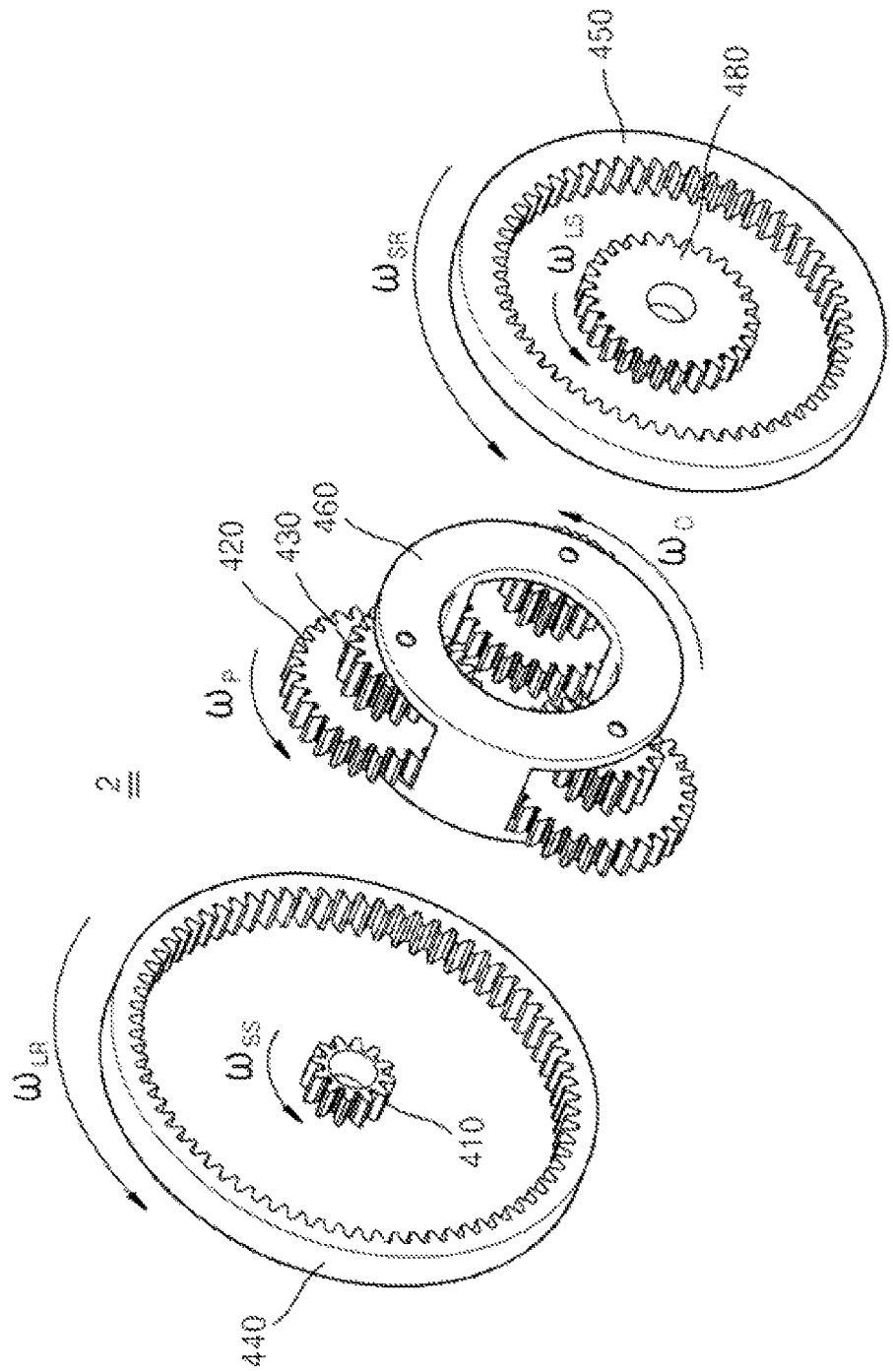
FIG. 11 is a view of the transmission apparatus according to one embodiment of the present invention.
Figure 12:
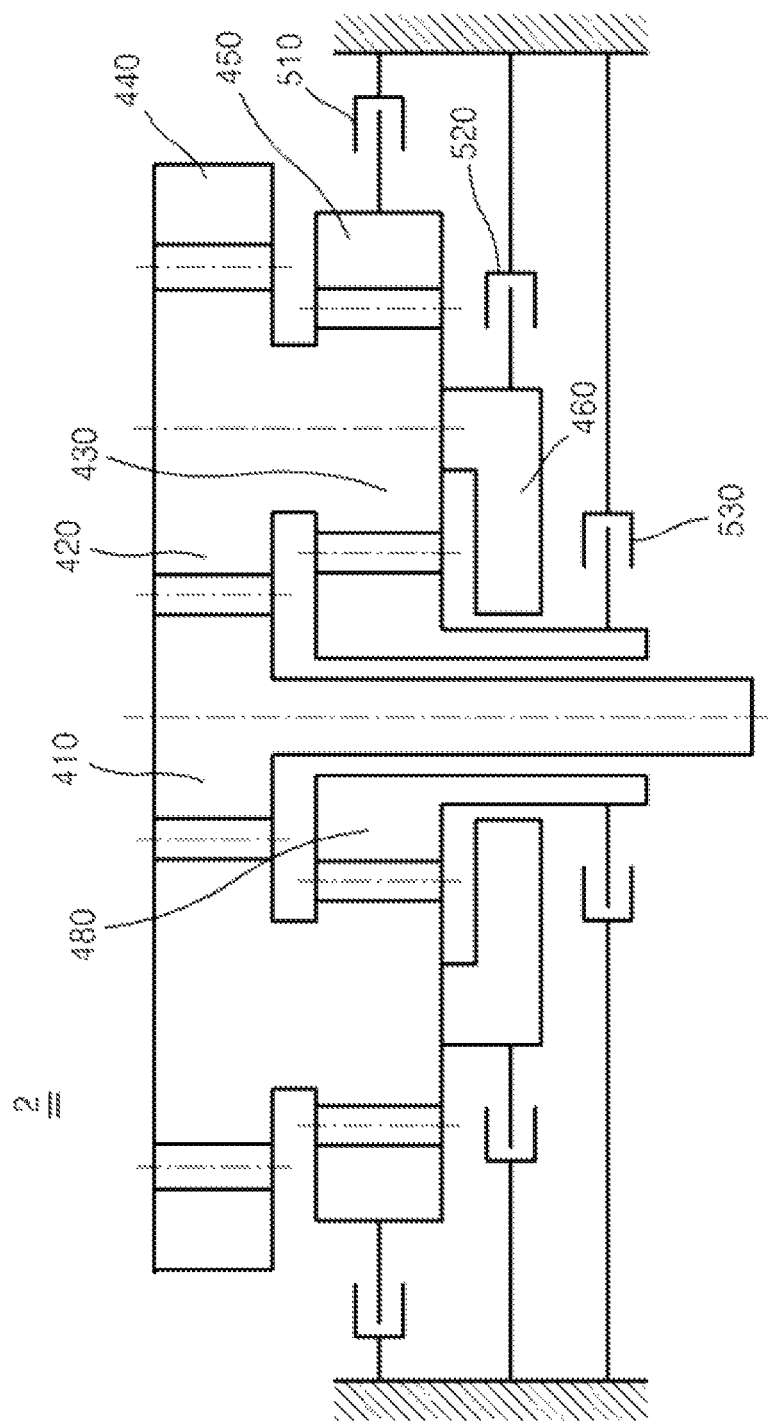
FIG. 12 is a view of the operation of the transmission apparatus according to one embodiment of the present invention.

FIG. 10 is a view of a transmission apparatus according to still another embodiment of the present invention, FIG. 11 is a view illustrating rotation which may be achieved in the transmission apparatus of FIG. 10, and FIG. 12 is a view illustrating an example of a gear state which may be achieved in the transmission apparatus of FIG. 10.

Referring to FIG. 10, the transmission apparatus according to one embodiment of the present invention may include a first sun gear 410, a first planetary gear 420, a second planetary gear 430, a first ring gear 440, a second ring gear 450, a cage 460, and a second sun gear 480.

For example, the first sun gear 410 may be connected with a member such as a desired shaft (not shown) serving as a rotational center. The first sun gear 410 may receive power from an outer side via the shaft (not shown), or may apply the power to the outer side.

For example, the second sun gear 480 may be connected with a member such as a desired shaft (not shown) serving as a rotational center, and may receive power from an outer side via the shaft (not shown), or may apply the power to the outer side. At this time, a rotational axis of the second sun gear 480 and a rotational axis of the first sun gear 410 are independently formed and disposed to be overlapped with each other. For example, as illustrated in FIG. 12, there may be provided a double rotary shaft structure in which a hollow portion is formed in a rotary shaft of the second sun gear 480, and a rotary shaft of the first sun gear 410 is disposed in the hollow portion.

Meanwhile, as illustrated in FIGS. 10 to 12, a diameter of the first sun gear 410 is formed to be smaller than that of the second sun gear 480, and thus the first sun gear 410 may be formed as a first sun gear, and the second sun gear 480 may be formed as a second sun gear.

The first planetary gear 420 is circumscribed about and engaged with the first sun gear 410. In FIGS. 10 and 11, three first planetary gears 420 are illustrated, but the present invention is not limited thereto. A plurality of first planetary gears 420 engaged with the first sun gear 410 may be disposed.

The second planetary gear 430 is circumscribed about and engaged with the second sun gear 480. Each second planetary gear 430 shares a rotary shaft with the first planetary gear 420, and forms a concentric circle. That is, the number of the second planetary gears 430 is the same as that of the first planetary gears 420, and each first planetary gear 420 and each second planetary gear 430 share the rotary shaft with each other, and form the concentric circle together. Therefore, the first and second planetary gears 420 and 430 are rotated together and have the same angular speed.

Meanwhile, in FIGS. 10 and 11, the first and second planetary gears 420 and 430 are in contact and integrally formed with each other, but are not limited thereto. The first and second planetary gears 420 and 430 may be connected so as to be spaced from each other by a connecting means, such as a shaft (not shown), which connects central axes of the first and second planetary gears 420 and 430, but are not limited thereto.

Further, as illustrated in FIGS. 10 to 12, a diameter of the first planetary gear 420 may be formed to be greater than that of the second planetary gear 430.

The first ring gear 440 is circumscribed about and engaged with the first planetary gear 420. That is, the first planetary gear 420 is circumscribed about the first sun gear 410, and the first ring gear 440 is circumscribed about the first planetary gear 420. At this time, a rotation center axis of the first ring gear 440 may be overlapped with that of the first sun gear 410.

The second ring gear 450 is circumscribed about and engaged with the second planetary gear 430. That is, the second planetary gear 430 is circumscribed about the second sun gear 480, and the second ring gear 450 is circumscribed about the second planetary gear 430. A rotational axis of the second ring gear 450 may be also formed to be overlapped with those of the first and second sun gears 410 and 480 and the first ring gear 440.

Meanwhile, as illustrated in FIGS. 10 to 12, a diameter of the first ring gear 440 may be formed to be greater than that of the second ring gear 450.

The cage 460 supports rotary shafts of the first and second planetary gears 420 and 430. For example, the first and second planetary gears 420 and 430 may have desired shafts (not shown) forming the rotational axes, and holes (not shown) in which the shafts are rotatably inserted may be formed at the cage 460.

The cage 460 may have a rotational axis, and the rotational axis of the cage 460 may be formed to be overlapped with the rotational axes of the first sun gear 410, the first ring gear 440, the second ring gear 450, and the second sun gear 480.

The cage 460 has the rotational axis overlapped with the rotational axes of the first and second sun gears 410 and 480, and is formed to support the rotary shafts of the first and second planetary gears 420 and 430. Therefore, when the first and second planetary gears 420 and 430 are revolved about the first and second sun gears 410 and 480, the rotational axes of the first and second planetary gears 420 and 430 are revolved about the first and second sun gears 410 and 480, and thus the cage 460 may be rotated in the same direction as a revolution direction thereof. Meanwhile, on the contrary, as the cage 460 is rotated, the first and second planetary gears 420 and 430 may be revolved about the first and second sun gears 410 and 480.

Meanwhile, although not shown in FIGS. 10 and 11, a brake member (not shown) capable of stopping the rotation of each element may be provided. As described above, the brake member (not shown) may be a desired friction brake or a desired gear brake. That is, for example, brake member (not shown) may be the gear brake including a rack gear having a gear part, a spring exerting an elastic force to the rack gear, a guide rail guiding a displacement of the rack gear, a rotary shaft serving as a rotation center of the guide ail, and a power transmission part displacing the rack gear, but is not limited thereto.

An operation of the brake member and thus an operation of the transmission apparatus will be described later.

As illustrated in FIG. 11, assuming that a rotation speed of the first sun gear 410 as a small sun gear is $\omega_{SS}$, a rotation speed of the second sun gear 480 as a large sun gear is $\omega_{LS}$, each rotation speed of the first planetary gear 420 as a large planetary gear and the second planetary gear 430 as a small planetary gear is $\omega_P$, a rotation speed of the first ring gear 440 as a large ring gear is $\omega_{LR}$, a rotation speed of the second ring gear 450 as a small ring gear is $\omega_{SR}$, and a rotation speed of the cage 460 is $\omega_C$, the following relation formulas are established in the transmission apparatus according to the embodiment.

$$D_{SS}\omega_{SS} = D_{SS}\omega_C - D_{LP}\omega_P$$

$$D_{LR}\omega_{LR} = D_{LR}\omega_C + D_{LP}\omega_P$$

$$D_{SR}\omega_{SR} = D_{SR}\omega_C + D_{SP}\omega_P$$

$$D_{LS}\omega_{LS} = D_{LS}\omega_C - D_{SP}\omega_P$$

In these relation formulas, $D_{SS}$ is a diameter of the first sun gear 410 as the small sun gear, $D_{LS}$ is a diameter of the second sun gear 480 as the large sun gear, $D_{LP}$ is a diameter of the first planetary gear 420 as the large planetary gear, $D_{SP}$ is a diameter of the second planetary gear 430 as the small planetary gear, $D_{LR}$ is a diameter of the first ring gear 440 as the large ring gear, and $D_{SR}$ is a diameter of the second ring gear 450 as the small ring gear.

In the above-mentioned four formulas, unknowns $\omega_{SS}$, $\omega_{LS}$, $\omega_P$, $\omega_{SR}$ and $\omega_C$ are six, and the formulas are four, and thus if two of the six unknowns are found, values of the rest four unknowns are determined. That is, the rest values including a rotation speed of the output shaft are determined according to a rotation speed of an input shaft and a rotation speed (=0) of one fixing shaft to which the brake is applied.

Since the rotation speed $\omega_P$ of the first and second planetary gears 420 and 430 among the six rotation speeds illustrated in FIG. 11 are not values which are generated at an outer side of the transmission apparatus, but the values which are determined by other values, the transmission apparatus 2 according to the embodiment has five rotary shafts which may be connected to an outer side and controlled.

That is, in the transmission apparatus according to the embodiment, the five rotary shafts including a rotary shaft of the first sun gear 410, a rotary shaft of the second sun gear 480, a rotary shaft of the first ring gear 440, a rotary shaft of the second ring gear 450, and a rotary shaft of the cage 460 may be connected with the outer side and controlled.

When one of the five rotary shafts is used as an input shaft, and another one is used as an output shaft, and still another one is fixed not to be rotated, the input shaft and the output shaft are rotated at a constant rate, and the change of speed is achieved. When considering the number of cases thereof a branch number in which one of the five rotary shafts may be selected as the input shaft is 5, and a branch number in which one of the rest four rotary shafts may be selected as the output shaft is 4, and a branch number in which one of the rest three rotary shafts may be selected as the fixing shaft is 3, and thus the number of all cases thereof is 60 (5×4×3=60).

The following Tables 1 to 5 indicate formulas which are induced relative to a reduction gear ratio between the input shaft and the output shaft in all of the cases. To reduce the number of characters in the formulas, the diameters $D_{LP}$ and $D_{SP}$ of the first and second planetary gears 420 and 430 are indicated as diameters of other gears. Further, in the Tables, a direction is indicated by a symbol "+" when the input shaft and the output shaft are rotated in the same direction, and also indicated by a symbol "−" when the input shaft and the output shaft are respectively rotated in different directions.

TABLE 1

Reduction gear ratio when the input terminal is the shaft of the first sun gear in the compound planetary gear set

| Input terminal | Output terminal | Fixing terminal | Reduction gear ratio | Direction |
|---|---|---|---|---|
| First sun gear | Second sun gear | Second ring gear | $\dfrac{w_{SS}}{w_{LS}} = \dfrac{D_{LS}(D_{SR}(D_{LR} - D_{SS}) + D_{SS}(D_{SR} - D_{LS}))}{D_{SS}((D_{SR})^2 - (D_{LS})^2)}$ | + |
| | | First ring gear | $\dfrac{w_{SS}}{w_{LS}} = \dfrac{D_{LS}((D_{LR})^2 - (D_{SS})^2)}{D_{SS}(D_{LR}(D_{SR} - D_{LS}) + D_{LS}(D_{LR} - D_{SS}))}$ | + |
| | | Cage | $\dfrac{w_{SS}}{w_{LS}} = \dfrac{D_{LS}(D_{LR} - D_{SS})}{D_{ss}(D_{SR} - D_{LS})}$ | + |
| | Second ring gear | Second sun gear | $\dfrac{w_{SS}}{w_{SR}} = -\dfrac{D_{SR}(D_{LS}(D_{LR} - D_{SS}) - D_{SS}(D_{SR} - D_{LS}))}{D_{SR}((D_{LR})^2 - (D_{LS})^2)}$ | − |
| | | First ring gear | $\dfrac{w_{SS}}{w_{SR}} = -\dfrac{D_{SR}((D_{LR})^2 - (D_{SS})^2)}{D_{SS}(D_{LR}(D_{SR} - D_{LS}) - D_{SR}(D_{LR} - D_{SS}))}$ | + |
| | | Cage | $\dfrac{w_{SS}}{w_{SR}} = -\dfrac{D_{SR}(D_{LR} - D_{SS})}{D_{SS}(D_{SR} - D_{LS})}$ | − |
| | First ring gear | Second ring gear | $\dfrac{w_{SS}}{w_{LR}} = -\dfrac{D_{LR}(D_{SR}(D_{LR} - D_{SS}) + D_{SS}(D_{SR} - D_{LS}))}{D_{SS}(D_{SR}(D_{LR} - D_{SS}) - D_{LR}(D_{SR} - D_{LS}))}$ | − |
| | | Second sun gear | $\dfrac{w_{SS}}{w_{LR}} = -\dfrac{D_{LR}(D_{LS}(D_{LR} - D_{SS}) - D_{SS}(D_{SR} - D_{LS}))}{D_{SS}(D_{LS}(D_{LR} - D_{SS}) + D_{LR}(D_{SR} - D_{LS}))}$ | − |
| | | Cage | $\dfrac{w_{SS}}{w_{LR}} = -\dfrac{D_{LR}}{D_{SS}}$ | − |
| | Cage | Second sun gear | $\dfrac{w_{SS}}{w_C} = \dfrac{D_{SS}(D_{SR} - D_{LS}) - D_{LS}(D_{LR} - D_{SS})}{D_{SS}(D_{SR} - D_{LS})}$ | − |
| | | First ring gear | $\dfrac{w_{SS}}{w_C} = \dfrac{D_{SS} + D_{LR}}{D_{SS}}$ | + |
| | | Second ring gear | $\dfrac{w_{SS}}{w_C} = \dfrac{D_{SS}(D_{SR} - D_{LS}) + D_{SR}(D_{LR} - D_{SS})}{D_{SS}(D_{SR} - D_{LS})}$ | + |

TABLE 2

Reduction gear ratio when the input terminal is the shaft of the second sun gear in the compound planetary gear set

| Input terminal | Output terminal | Fixing terminal | Reduction gear ratio | Direction |
|---|---|---|---|---|
| Second sun gear | First sun gear | Second ring gear | $\dfrac{w_{LS}}{w_{SS}} = \dfrac{D_{SS}((D_{SR})^2 - (D_{LS})^2)}{D_{LS}(D_{SR}(D_{LR} - D_{SS}) + D_{SS}(D_{SR} - D_{LS}))}$ | + |
| | | First ring gear | $\dfrac{w_{LS}}{w_{SS}} = \dfrac{D_{SS}(D_{LR}(D_{SR} - D_{LS}) + D_{LS}(D_{LR} - D_{SS}))}{D_{LS}((D_{LR})^2 - (D_{SS})^2)}$ | + |
| | | Cage | $\dfrac{w_{LS}}{w_{SS}} = \dfrac{D_{SS}(D_{SR} - D_{LS})}{D_{LS}(D_{LR} - D_{SS})}$ | + |
| | Second ring gear | First sun gear | $\dfrac{w_{LS}}{w_{SR}} = -\dfrac{D_{SR}(D_{SS}(D_{SR} - D_{LS}) - D_{LS}(D_{LR} - D_{SS}))}{D_{LS}(D_{SS}(D_{SR} - D_{LS}) + D_{SR}(D_{LR} - D_{SS}))}$ | + |
| | | First ring gear | $\dfrac{w_{LS}}{w_{SR}} = -\dfrac{D_{SR}(D_{LR}(D_{SR} - D_{LS}) + D_{LS}(D_{LR} - D_{SS}))}{D_{LS}(D_{LR}(D_{SR} - D_{LS}) - D_{SR}(D_{LR} - D_{SS}))}$ | + |
| | | Cage | $\dfrac{w_{LS}}{w_{SR}} = -\dfrac{D_{SR}}{D_{LS}}$ | − |
| | First ring gear | Second ring gear | $\dfrac{w_{LS}}{w_{LR}} = -\dfrac{D_{LR}((D_{SR})^2 - (D_{LS})^2)}{D_{LS}(D_{SR}(D_{LR} - D_{SS}) - D_{LR}(D_{SR} - D_{LS}))}$ | − |
| | | First sun gear | $\dfrac{w_{LS}}{w_{LR}} = -\dfrac{D_{LR}(D_{SS}(D_{SR} - D_{LS}) - D_{LS}(D_{LR} - D_{SS}))}{D_{LS}((D_{LR})^2 - (D_{SS})^2)}$ | + |
| | | Cage | $\dfrac{w_{LS}}{w_{LR}} = -\dfrac{D_{LR}(D_{SR} - D_{LS})}{D_{LS}(D_{LR} - D_{SS})}$ | − |
| | Cage | First sun gear | $\dfrac{w_{LS}}{w_C} = \dfrac{D_{LS}(D_{LR} - D_{SS}) - D_{SS}(D_{SR} - D_{LS})}{D_{LS}(D_{LR} - D_{SS})}$ | + |
| | | First ring gear | $\dfrac{w_{LS}}{w_C} = \dfrac{D_{LS}(D_{LR} - D_{SS}) + D_{LR}(D_{SR} - D_{LS})}{D_{LS}(D_{LR} - D_{SS})}$ | + |
| | | Second ring gear | $\dfrac{w_{LS}}{w_C} = \dfrac{D_{LS} + D_{SR}}{D_{LS}}$ | + |

TABLE 3

Reduction gear ratio when the input terminal is the shaft of the second ring gear in the compound planetary gear set

| Input terminal | Output terminal | Fixing terminal | Reduction gear ratio | Direction |
|---|---|---|---|---|
| Second ring gear | Second sun gear | First sun gear | $\dfrac{w_{SR}}{w_{LS}} = -\dfrac{D_{LS}(D_{SS}(D_{SR} - D_{LS}) + D_{SR}(D_{LR} - D_{SS}))}{D_{SR}(D_{SS}(D_{SR} - D_{LS}) - D_{LS}(D_{LR} - D_{SS}))}$ | + |
| | | First ring gear | $\dfrac{w_{SR}}{w_{LS}} = -\dfrac{D_{LS}(D_{LR}(D_{SR} - D_{LS}) - D_{SR}(D_{LR} - D_{SS}))}{D_{SR}(D_{LR}(D_{SR} - D_{LS}) + D_{LS}(D_{LR} - D_{SS}))}$ | + |
| | | Cage | $\dfrac{w_{SR}}{w_{LS}} = -\dfrac{D_{LS}}{D_{SR}}$ | − |
| | First sun gear | Second sun gear | $\dfrac{w_{SR}}{w_{SS}} = -\dfrac{D_{SS}((D_{SR})^2 - (D_{LS})^2)}{D_{SR}(D_{LS}(D_{LR} - D_{SS}) - D_{SS}(D_{SR} - D_{LS}))}$ | − |
| | | First ring gear | $\dfrac{w_{SR}}{w_{SS}} = -\dfrac{D_{SS}(D_{LR}(D_{SR} - D_{LS}) - D_{LR}(D_{LR} - D_{SS}))}{D_{SR}((D_{LR})^2 - (D_{SS})^2)}$ | + |
| | | Cage | $\dfrac{w_{SR}}{w_{SS}} = -\dfrac{D_{SS}(D_{SR} - D_{LS})}{D_{SR}(D_{LR} - D_{SS})}$ | − |

TABLE 3-continued

Reduction gear ratio when the input terminal is the shaft of the second ring gear in the compound planetary gear set

| Input terminal | Output terminal | Fixing terminal | Reduction gear ratio | Direction |
|---|---|---|---|---|
| | First ring gear | First sun gear | $\dfrac{w_{SR}}{w_{LR}} = \dfrac{D_{LR}(D_{SS}(D_{SR} - D_{LS}) + D_{SR}(D_{LR} - D_{SS}))}{D_{SR}((D_{LR})^2 - (D_{SS})^2)}$ | + |
| | | Second sun gear | $\dfrac{w_{SR}}{w_{LR}} = \dfrac{D_{LR}((D_{SR})^2 - (D_{LS})^2)}{D_{SR}(D_{LS}(D_{LR} - D_{SS}) + D_{LR}(D_{SR} - D_{LS}))}$ | |
| | | Cage | $\dfrac{w_{SR}}{w_{LR}} = \dfrac{D_{LR}(D_{SR} - D_{LS})}{D_{SR}(D_{LR} - D_{SS})}$ | + |
| Cage | Second sun gear | | $\dfrac{w_{SR}}{w_C} = \dfrac{D_{LS} + D_{SR}}{D_{SR}}$ | + |
| | First ring gear | | $\dfrac{w_{SR}}{w_C} = -\dfrac{D_{LR}(D_{SR} - D_{LS}) - D_{SR}(D_{LR} - D_{SS})}{D_{SR}(D_{LR} - D_{SS})}$ | + |
| | First sun gear | | $\dfrac{w_{SR}}{w_C} = \dfrac{D_{SR}(D_{LR} - D_{SS}) + D_{SS}(D_{SR} - D_{LS})}{D_{SR}(D_{LR} - D_{SS})}$ | + |

TABLE 4

Reduction gear ratio when the input terminal is the shaft of the first ring gear in the compound planetary gear set

| Input terminal | Output terminal | Fixing terminal | Reduction gear ratio | Direction |
|---|---|---|---|---|
| First ring gear | Second sun gear | Second ring gear | $\dfrac{w_{LR}}{w_{LS}} = -\dfrac{D_{LS}(D_{SR}(D_{LR} - D_{SS}) - D_{LR}(D_{SR} - D_{LS}))}{D_{LR}((D_{SR})^2 - (D_{LS})^2)}$ | − |
| | | First sun gear | $\dfrac{w_{LR}}{w_{LR}} = -\dfrac{D_{LS}((D_{LR})^2 - (D_{SS})^2)}{D_{LR}(D_{SS}(D_{SR} - D_{LS}) - D_{LS}(D_{LR} - D_{SS}))}$ | + |
| | | Cage | $\dfrac{w_{LR}}{w_{LS}} = -\dfrac{D_{LS}(D_{LR} - D_{SS})}{D_{LR}(D_{SR} - D_{LS})}$ | − |
| | Second ring gear | First sun gear | $\dfrac{w_{LR}}{w_{SR}} = \dfrac{D_{SR}((D_{LR})^2 - (D_{SS})^2)}{D_{LR}(D_{SS}(D_{SR} - D_{LS}) + D_{SR}(D_{LR} - D_{SS}))}$ | + |
| | | Second sun gear | $\dfrac{w_{LR}}{w_{SR}} = \dfrac{D_{SR}(D_{LS}(D_{LR} - D_{SS}) + D_{LR}(D_{SR} - D_{LS}))}{D_{LR}((D_{SR})^2 - (D_{LS})^2)}$ | + |
| | | Cage | $\dfrac{w_{LR}}{w_{SR}} = \dfrac{D_{SR}(D_{LR} - D_{SS})}{D_{LR}(D_{SR} - D_{LS})}$ | + |
| | First sun gear | Second ring gear | $\dfrac{w_{LR}}{w_{SS}} = -\dfrac{D_{SS}(D_{SR}(D_{LR} - D_{SS}) - D_{LR}(D_{SR} - D_{LS}))}{D_{LR}(D_{SR}(D_{LR} - D_{SS}) + D_{SS}(D_{SR} - D_{LS}))}$ | − |
| | | Second sun gear | $\dfrac{w_{LR}}{w_{SS}} = -\dfrac{D_{SS}(D_{LS}(D_{LR} - D_{SS}) + D_{LR}(D_{SR} - D_{LS}))}{D_{LR}(D_{LS}(D_{LR} - D_{SS}) - D_{SS}(D_{SR} - D_{LS}))}$ | − |
| | | Cage | $\dfrac{w_{LR}}{w_{SS}} = -\dfrac{D_{SS}}{D_{LR}}$ | − |

TABLE 4-continued

Reduction gear ratio when the input terminal is the shaft of
the first ring gear in the compound planetary gear set

| Input terminal | Output terminal | Fixing terminal | Reduction gear ratio | Direction |
|---|---|---|---|---|
| | Cage | Second sun gear | $\dfrac{w_{LR}}{w_C} = \dfrac{D_{LR}(D_{SR} - D_{LS}) + D_{LS}(D_{LR} - D_{SS})}{D_{LR}(D_{SR} - D_{LS})}$ | + |
| | | First sun gear | $\dfrac{w_{LR}}{w_C} = \dfrac{D_{SS} + D_{LR}}{D_{LR}}$ | + |
| | | Second ring gear | $\dfrac{w_{LR}}{w_C} = -\dfrac{D_{SR}(D_{LR} - D_{SS}) - D_{LR}(D_{SR} - D_{LS})}{D_{LR}(D_{SR} - D_{LS})}$ | − |

TABLE 5

Reduction gear ratio when the input terminal is the shaft of
the cage in the compound planetary gear set

| Input terminal | Output terminal | Fixing terminal | Reduction gear ratio | Direction |
|---|---|---|---|---|
| Cage | Second sun gear | First sun gear | $\dfrac{w_C}{w_{LS}} = \dfrac{D_{LS}(D_{LR} - D_{SS})}{D_{LS}(D_{LS} - D_{SS}) - D_{SS}(D_{SR} - D_{LS})}$ | + |
| | | First ring gear | $\dfrac{w_C}{w_{LS}} = \dfrac{D_{LS}(D_{LR} - D_{SS})}{D_{LS}(D_{LR} - D_{SS}) + D_{LR}(D_{SR} - D_{LS})}$ | + |
| | | Second ring gear | $\dfrac{w_C}{w_{LS}} = \dfrac{D_{LS}}{D_{LS} + D_{SR}}$ | + |
| | Second ring gear | Second sun gear | $\dfrac{w_C}{w_{SR}} = \dfrac{D_{SR}}{D_{LS} + D_{SR}}$ | + |
| | | First ring gear | $\dfrac{w_C}{w_{SR}} = -\dfrac{D_{SR}(D_{LR} - D_{SS})}{D_{LR}(D_{SR} - D_{LS}) - D_{SR}(D_{LR} - D_{SS})}$ | + |
| | | First sun gear | $\dfrac{w_C}{w_{SR}} = \dfrac{D_{SR}(D_{LR} - D_{SS})}{D_{SR}(D_{LR} - D_{SS}) + D_{SS}(D_{SR} - D_{LS})}$ | + |
| | First ring gear | Second sun gear | $\dfrac{w_C}{w_{LR}} = \dfrac{D_{LR}(D_{SR} - D_{LS})}{D_{LR}(D_{SR} - D_{LS}) + D_{LS}(D_{LR} - D_{SS})}$ | + |
| | | First sun gear | $\dfrac{w_C}{w_{LR}} = \dfrac{D_{LR}}{D_{SS} + D_{LR}}$ | + |
| | | Second ring gear | $\dfrac{w_C}{w_{LR}} = -\dfrac{D_{LR}(D_{SR} - D_{LS})}{D_{SR}(D_{LR} - D_{SS}) - D_{LR}(D_{SR} - D_{LS})}$ | − |
| | First sun gear | Second sun gear | $\dfrac{w_C}{w_{SS}} = \dfrac{D_{SS}(D_{SR} - D_{LS})}{D_{SS}(D_{SR} - D_{LS}) - D_{LS}(D_{LR} - D_{SS})}$ | − |
| | | First ring gear | $\dfrac{w_C}{w_{SS}} = \dfrac{D_{SS}}{D_{LR} + D_{SS}}$ | + |
| | | Second ring gear | $\dfrac{w_C}{w_{SS}} = \dfrac{D_{SS}(D_{SR} - D_{LS})}{D_{SS}(D_{SS} - D_{LS}) + D_{SR}(D_{LR} - D_{SS})}$ | + |

The reason why the rotation direction important is because, even when the input terminal and the output terminal are determined and the brake is applied to one of the rest three rotary shafts such that the one of the rest three rotary shafts is converted into a fixing terminal, if the rotation direction is not changed (for example, when the output terminal is the second sun gear 480 or the first ring gear 440 in Table 1) it may be used as a 3-stage transmission.

For example, FIG. 12 illustrates a case in which the first sun gear 410 as the small sun gear is the input terminal, and the first ring gear 440 as the large ring gear is the output terminal.

It may be used as the 3-stage transmission apparatus by applying the brake 510, 520, 530 to one of the second ring gear 450 as the small ring gear, the cage 460, and the second sun gear 480 as the large sun gear.

However, a case in which the rotation direction is changed (for example, the case in which the output terminal is the cage in Table 1) may be actively used. When an output of an engine which may not be reversely rotated is connected to the input terminal and the output terminal of the transmission apparatus drives wheels, a rearward movement may be performed by changing the rotation direction. (In this case, a 2-stage speed change may be performed in a forward movement).

Table 6 illustrates various combination examples of a pitch circle diameter which may form the compound planetary gear act included in the transmission apparatus according to the embodiment. Meanwhile, Table 7 illustrates results of the reduction gear ratios of the gear sets in Table 6, which are calculated using Tables 1 to 5.

As illustrated in Table 7, in the case in which the first sun gear 410 is used as the input terminal and the first ring gear 440 is used as the output terminal, or the second ring gear 450 is used as the input terminal and the cage 460 is used as the output terminal, it is possible to realize a transmission apparatus in which the speed is increased at a same ratio when the change of speed is performed from a low speed to a middle speed and when the change of speed is performed from the middle speed to a high speed. Further, on the contrary to this, when the first ring gear 440 is used as the input terminal and the first sun gear 410 is used as the output terminal, it may be used as the transmission apparatus which may increase the speed like in a wind power plant.

TABLE 6

An example of the compound planetary gear set according to a combination of various pitch circle diameters

| | First sun gear | Second sun gear | Second ring gear | First ring gear |
|---|---|---|---|---|
| First set | 12 | 24 | 48 | 60 |
| Second set | 12 | 21.6 | 50.4 | 60 |
| Third set | 12 | 19.2 | 52.8 | 60 |
| Fourth set | 12 | 16.8 | 55.2 | 60 |
| Fifth set | 12 | 36 | 60 | 84 |
| Sixth set | 14.4 | 33.6 | 62.4 | 81.6 |
| Seventh set | 12 | 27 | 57 | 72 |

TABLE 7

Reduction gear ratio according to a combination of gears of Table 6

| Input terminal | Output terminal | Fixing terminal | First set | Second set | Third set | Fourth set | Fifth set | Sixth set | Seventh set |
|---|---|---|---|---|---|---|---|---|---|
| First sun gear | Second sun gear | Second ring gear | 3.000 | 2.400 | 1.943 | 1.575 | 6.000 | 3.889 | 3.375 |
| | | First ring gear | 2.667 | 2.250 | 1.882 | 1.556 | 4.500 | 3.267 | 3.000 |
| | | Cage | 4.000 | 3.000 | 2.286 | 1.750 | 9.000 | 5.444 | 4.500 |
| | Second ring gear | Second sun gear | −3.333 | −2.800 | −2.410 | −2.108 | −6.250 | −4.189 | −3.732 |
| | | First ring gear | −3.692 | −3.500 | −3.342 | −3.209 | −5.455 | −4.272 | −4.290 |
| | | Cage | −8.000 | −7.000 | −6.286 | −5.750 | −15.000 | −10.111 | −9.500 |
| | First ring gear | Second ring gear | −15.000 | −20.000 | −28.333 | −45.000 | −14.000 | −14.167 | −18.000 |
| | | Second sun gear | −1.667 | −1.250 | −0.882 | −0.556 | −3.500 | −2.267 | −2.000 |
| | | Cage | −5.000 | −5.000 | −5.000 | −5.000 | −7.000 | −5.667 | −6.000 |
| | Cage | Second sun gear | −3.000 | −2.000 | −1.286 | −0.750 | −8.000 | −4.444 | −3.500 |
| | | First ring gear | 6.000 | 6.000 | 6.000 | 6.000 | 8.000 | 6.667 | 7.000 |
| | | Second ring gear | 9.000 | 8.000 | 7.286 | 6.750 | 16.000 | 11.111 | 10.500 |
| Second sun gear | First sun gear | Second ring gear | 0.333 | 0.417 | 0.515 | 0.635 | 0.167 | 0.257 | 0.296 |
| | | First ring gear | 0.375 | 0.444 | 0.531 | 0.643 | 0.222 | 0.306 | 0.333 |
| | | Cage | 0.250 | 0.333 | 0.438 | 0.571 | 0.111 | 0.184 | 0.222 |
| | Second ring gear | First sun gear | 0.667 | 0.583 | 0.485 | 0.365 | 0.833 | 0.743 | 0.704 |
| | | First ring gear | 6.000 | 9.333 | 15.583 | 29.571 | 3.333 | 4.643 | 6.333 |
| | | Cage | −2.000 | −2.333 | −2.750 | −3.286 | −1.667 | −1.857 | −2.111 |
| | First ring gear | Second ring gear | −5.000 | −8.333 | −14.583 | −28.571 | −2.333 | −3.643 | −5.333 |

TABLE 7-continued

Reduction gear ratio according to a combination of gears of Table 6

| Input terminal | Output terminal | Fixing terminal | First set | Second set | Third set | Fourth set | Fifth set | Sixth set | Seventh set |
|---|---|---|---|---|---|---|---|---|---|
| | | First sun gear | 0.250 | 0.200 | 0.150 | 0.100 | 0.333 | 0.286 | 0.250 |
| | | Cage | −1.250 | −1.667 | −2.188 | −2.857 | −0.778 | −1.041 | −1.333 |
| | cage | First sun gear | 0.750 | 0.667 | 0.563 | 0.429 | 0.889 | 0.816 | 0.778 |
| | | First ring gear | 2.250 | 2.667 | 3.188 | 3.857 | 1.778 | 2.041 | 2.333 |
| | | Second ring gear | 3.000 | 3.333 | 3.750 | 4.286 | 2.667 | 2.857 | 3.111 |
| Second ring gear | Second sun gear | First sun gear | 1.500 | 1.714 | 2.061 | 2.739 | 1.200 | 1.346 | 1.421 |
| | | First ring gear | 0.167 | 0.107 | 0.064 | 0.034 | 0.300 | 0.215 | 0.158 |
| | | Cage | −0.500 | −0.429 | −0.364 | −0.304 | −0.600 | −0.538 | −0.474 |
| | First sun gear | Second sun gear | −0.300 | −0.357 | −0.415 | −0.474 | −0.160 | −0.239 | −0.268 |
| | | First ring gear | −0.271 | −0.286 | −0.299 | −0.312 | −0.183 | −0.234 | −0.233 |
| | | Cage | −0.125 | −0.143 | −0.159 | −0.174 | −0.067 | −0.099 | −0.105 |
| | First ring gear | First sun gear | −0.729 | −0.714 | −0.701 | −0.688 | −0.817 | −0.766 | −0.767 |
| | | Second sun gear | 0.833 | 0.893 | 0.936 | 0.966 | 0.700 | 0.785 | 0.842 |
| | | Cage | 0.625 | 0.714 | 0.795 | 0.870 | 0.467 | 0.560 | 0.632 |
| | Cage | Second sun gear | 1.500 | 1.429 | 1.364 | 1.304 | 1.600 | 1.538 | 1.474 |
| | | First ring gear | 0.375 | 0.286 | 0.205 | 0.130 | 0.533 | 0.440 | 0.368 |
| | | First sun gear | 0.875 | 0.857 | 0.841 | 0.826 | 0.933 | 0.901 | 0.895 |
| First ring gear | Second sun gear | Second ring gear | −0.200 | −0.120 | −0.069 | −0.035 | −0.429 | −0.275 | −0.188 |
| | | First sun gear | 1.600 | 1.800 | 2.133 | 2.800 | 1.286 | 1.441 | 1.500 |
| | | Cage | −0.800 | −0.600 | −0.457 | −0.350 | −1.286 | −0.961 | −0.750 |
| | Second ring gear | First sun gear | −1.371 | −1.400 | −1.427 | −1.453 | −1.224 | −1.306 | −1.304 |
| | | Second sun gear | 1.200 | 1.120 | 1.069 | 1.035 | 1.429 | 1.275 | 1.188 |
| | | Cage | 1.600 | 1.400 | 1.257 | 1.150 | 2.143 | 1.784 | 1.583 |
| | First sun gear | Second ring gear | −0.067 | −0.050 | −0.035 | −0.022 | −0.071 | −0.071 | −0.056 |
| | | Second sun gear | −0.600 | −0.800 | −1.133 | −1.800 | −0.286 | −0.441 | −0.500 |
| | | Cage | −0.200 | −0.200 | −0.200 | −0.200 | −0.143 | −0.176 | −0.167 |
| | Cage | Second sun gear | 1.800 | 1.600 | 1.457 | 1.350 | 2.286 | 1.961 | 1.750 |
| | | First sun gear | 1.200 | 1.200 | 1.200 | 1.200 | 1.143 | 1.176 | 1.167 |
| | | Second ring gear | −0.600 | −0.400 | −0.257 | −0.150 | −1.143 | −0.784 | −0.583 |

TABLE 7-continued

Reduction gear ratio according to a combination of gears of Table 6

| Input terminal | Output terminal | Fixing terminal | First set | Second set | Third set | Fourth set | Fifth set | Sixth set | Seventh set |
|---|---|---|---|---|---|---|---|---|---|
| Cage | Second sun gear | First sun gear | 1.333 | 1.500 | 1.778 | 2.333 | 1.125 | 1.225 | 1.286 |
| | | First ring gear | 0.444 | 0.375 | 0.314 | 0.259 | 0.563 | 0.490 | 0.429 |
| | | Second ring gear | 0.333 | 0.300 | 0.267 | 0.233 | 0.375 | 0.350 | 0.321 |
| | Second ring gear | Second sun gear | 0.667 | 0.700 | 0.733 | 0.767 | 0.625 | 0.650 | 0.679 |
| | | First ring gear | 2.667 | 3.500 | 4.889 | 7.667 | 1.875 | 2.275 | 2.714 |
| | | First sun gear | 1.143 | 1.167 | 1.189 | 1.211 | 1.071 | 1.110 | 1.118 |
| | First ring gear | Second sun gear | 0.556 | 0.625 | 0.686 | 0.741 | 0.438 | 0.510 | 0.571 |
| | | First sun gear | 0.833 | 0.833 | 0.833 | 0.833 | 0.875 | 0.850 | 0.857 |
| | | Second ring gear | −1.667 | −2.500 | −3.889 | −6.667 | −0.875 | −1.275 | −1.714 |
| | First sun gear | Second sun gear | −0.333 | −0.500 | −0.778 | −1.333 | −0.125 | −0.225 | −0.286 |
| | | First ring gear | 0.167 | 0.167 | 0.167 | 0.167 | 0.125 | 0.150 | 0.143 |
| | | Second ring gear | 0.111 | 0.125 | 0.137 | 0.148 | 0.063 | 0.090 | 0.095 |

Further, in the transmission apparatus according to the embodiment, the Output terminal may be freely rotated by opening all of the rotary shafts except the input terminal and the output terminal, and thus if the transmission apparatus is applied to a vehicle, it is possible to embody a state (a neutral gear state of the vehicle) in which the vehicle may be pushed by a person. Further, when the brake is applied to two or more of the three rotary shafts except the input terminal and the output terminal, the braking force may be applied to the rotation of the output terminal, and it may serve as a main brake or a side brake when being applied to the vehicle.

This characteristic has another advantage in embodying break-by-wire. Since the braking force is applied to the output terminal even when the braking force is applied to certain two of the three rotary shafts except the input terminal and the output terminal, the vehicle may be stopped by two brakes even when one of the three brakes is broken down. Therefore, stability of the brake may be further enhanced.

Meanwhile, the previous description has described a case in which the 3-stage speed change, or forward 2-stage and backward 1-stage speed change is performed in a state having all of the six elements (the first sun gear 410, the second sun gear 480, the first planetary gear 420, the second planetary gear 430, the first ring gear 440, and the second ring gear 450) forming the compound planetary gear set. However, even when one of four elements except the essential first and second planetary gears 420 and 430 serving to connect the sun gear with the ring gear is not provided, it may function as the transmission apparatus. In this case, the removed element corresponds to a state in which the rotary shaft of the removed element is opened, and thus the rotary shaft may be regarded as that the brake is not applied thereto in a state in which all of the six elements are provided. In this case, since the brake may be applied to two shafts, the 2-stage speed change may be achieved, and the reduction gear ratio may be found from Tables 1 to 5. That is, the transmission apparatus 1 according to the above-mentioned first embodiment corresponds to this state, and if only the 2-stage speed change is sufficient and the apparatus should be further simplified, such a reduction gear may be provided.

Hereinafter, a transmission apparatus according to another embodiment of the present invention will be described.

Figure 13:
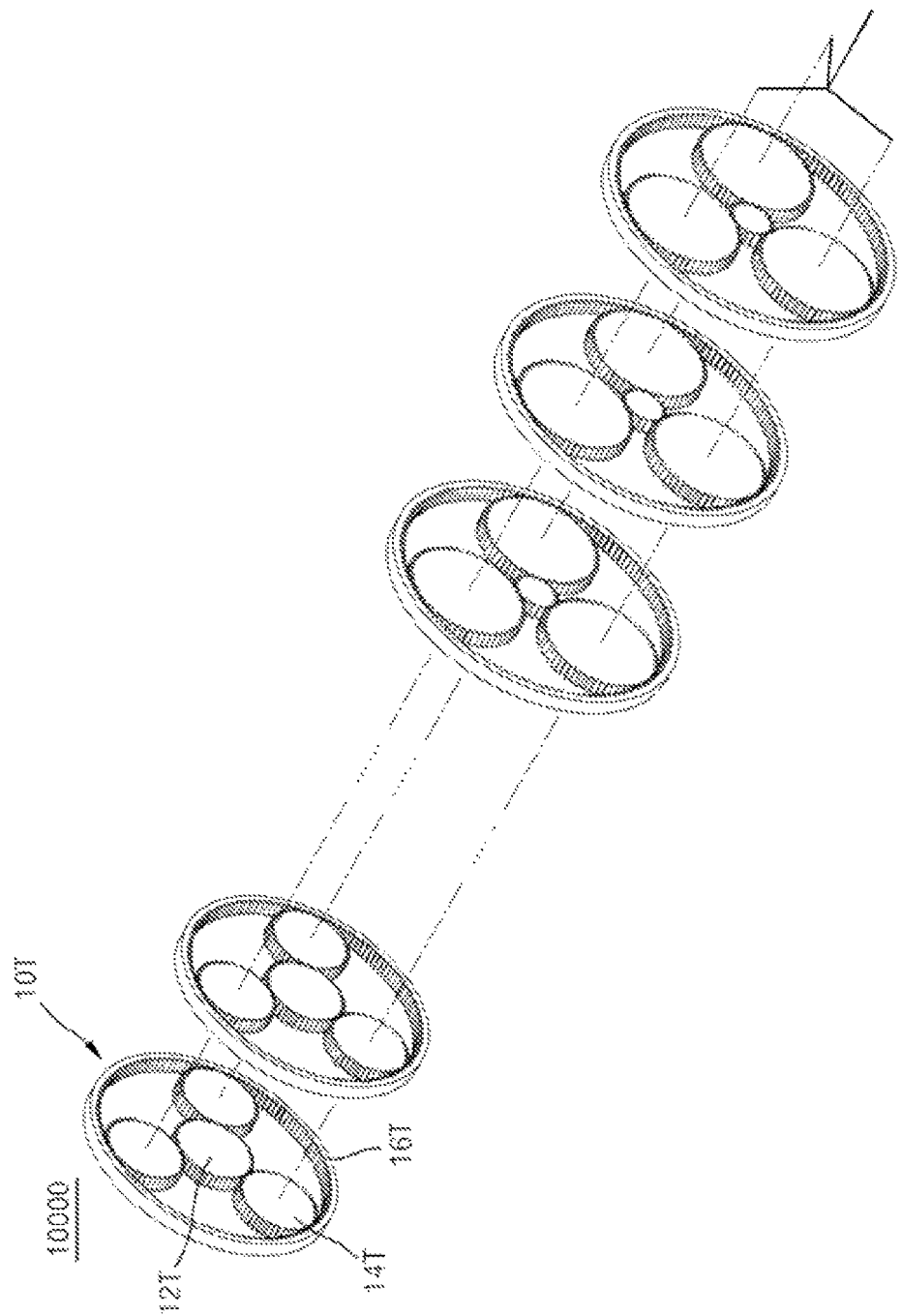
FIG. 13 is a view illustrating a structure of a gear stage of the transmission apparatus according to one embodiment of the present invention.
Figure 14:
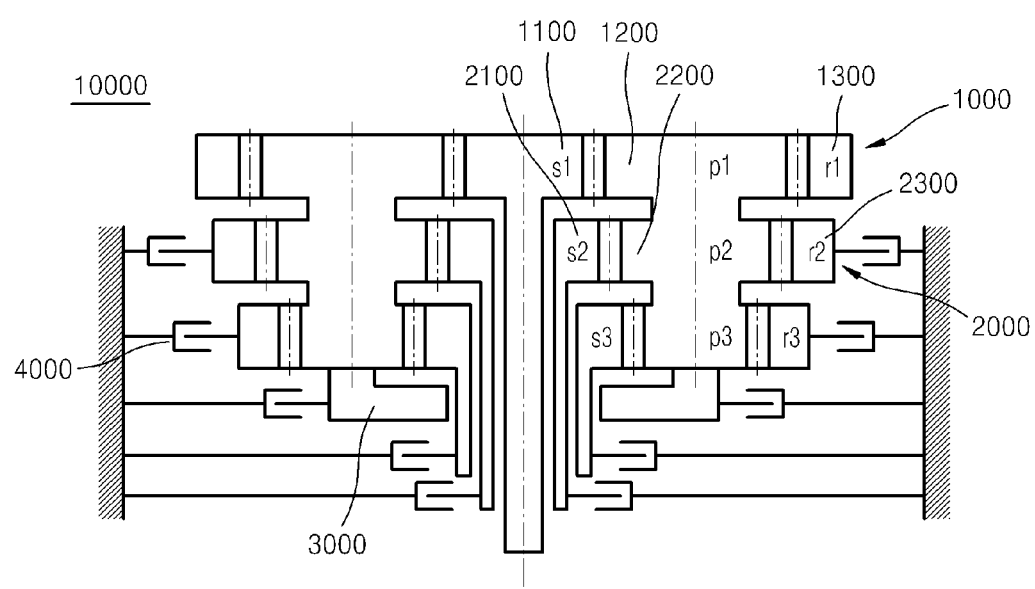
FIG. 14 is a view of the transmission apparatus according to one embodiment of the present invention.
Figure 15:
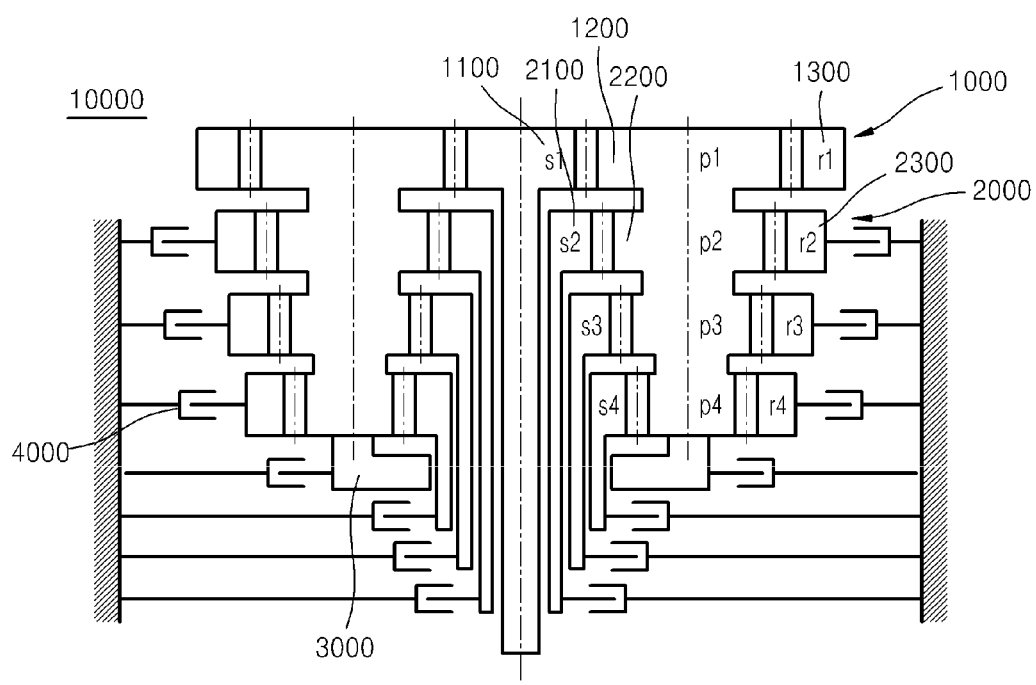
FIG. 15 is a view of the transmission apparatus according to one embodiment of the present invention.
Figure 16:
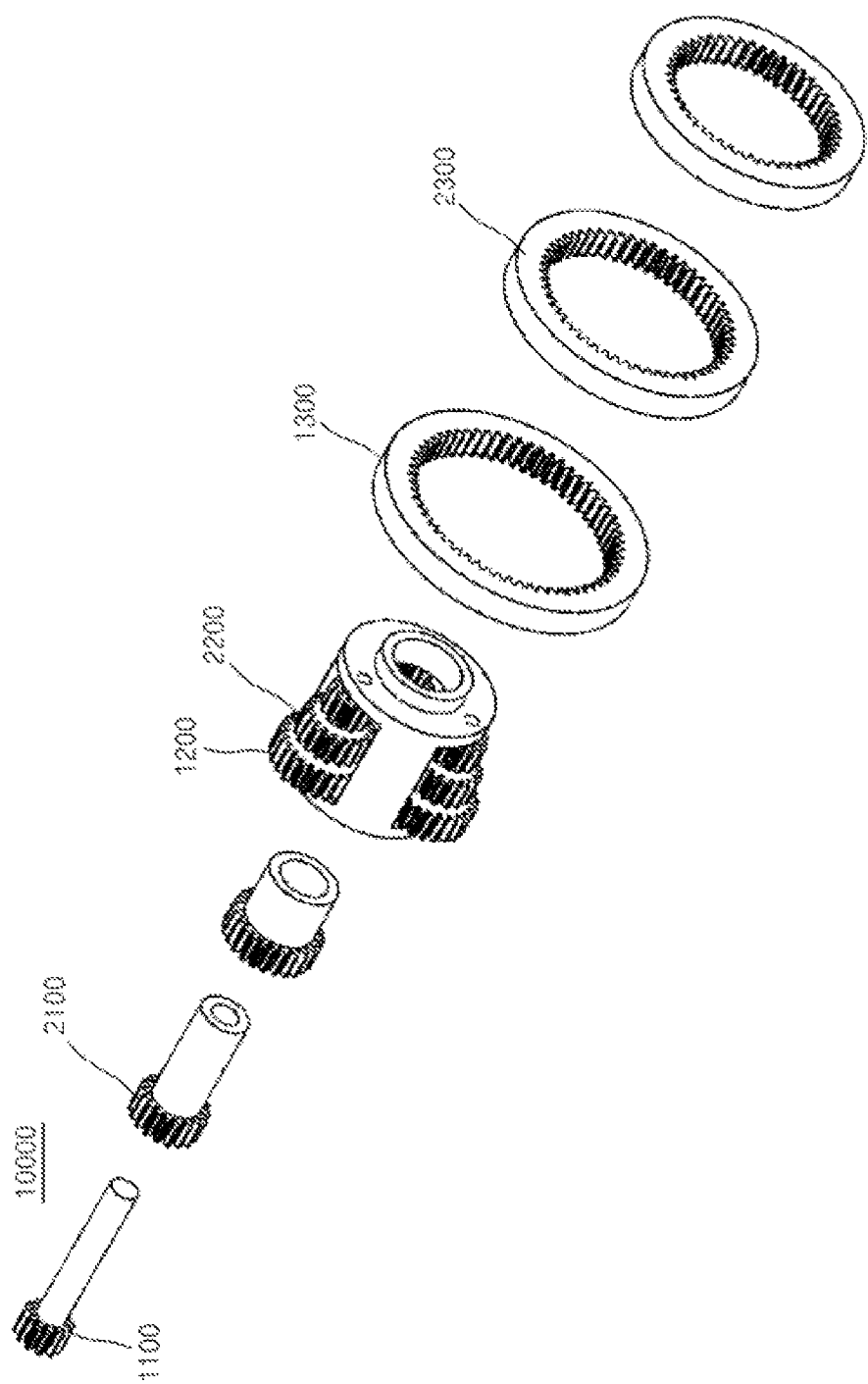
FIG. 16 is a view illustrating the structure of the gear stage of the transmission apparatus according to one embodiment of the present invention.

FIG. 13 is a view illustrating a structure of a gear stage of the transmission apparatus according to one embodiment of the present invention, FIGS. 14, 15, 17, and 18 are views illustrating the transmission apparatus according to one embodiment of the present invention, and FIG. 16 is a view illustrating a structure of a gear stage of the transmission apparatus according to one embodiment of the present invention.

The transmission apparatus according to the present invention is a transmission apparatus for changing speed between the input terminal and the output terminal. The transmission apparatus includes N gear stages (N>2) having a structure arranged in a multi-stage manner, cage, and a brake member.

Each gear stage includes at least one of a sun gear and a ring gear, and a plurality of planetary gears.

The sun gear disposed at a revolution center of the plurality of planetary gears, and the plurality of planetary gears are circumscribed about and engaged with the sun gear, and the ring gear is inscribed about and engaged with the plurality of planetary gears.

Each sun gear included in the plurality of gear stages is coaxially arranged and configured to have a separate shaft.

Each planetary gear included in the plurality of a stages is disposed to correspond to each other in each gear stage, and the plurality of planetary gears in each gear stage form a concentric circle and are integrally formed. The cage supports rotary shafts of the planetary gears such that the planetary gears may be revolved about the sun gear.

When one of rotary shafts of the sun gears, rotary shafts of the ring gears, and a rotary shaft of the cage is used as the input terminal and another one is used as the output terminal, the brake member acts on one of the rest rotary shafts except the input terminal and the output terminal, and thus the change of speed is performed.

FIG. 13 is a conceptual view illustrating a structure of a gear stage 10T of a transmission apparatus 10000 according to the present invention.

The transmission apparatus 10000 according to the present invention may have a structure in which the plurality of gear stages 10T including a plurality of gears are stacked in the multi-stage manner.

In other words, assuming that each gear stage 10T is a gear set forming one row, the transmission apparatus 10000 according to the present invention may be described as a gear set having N rows.

Hereinafter, a structure of each gear stage 10T will be described with reference to FIG. 13.

One gear stage 10T includes a plurality of planetary gears 14T, and also includes at least one of a sun gear 12T and a ring gear 16T, other than the planetary gears 14T. Therefore, the one gear stage 10T which is one of the plurality of gear stages 10T may have a structure having all of the sun gear 12T, the planetary gears 14T, and the ring gear 16T, or a structure having the planetary gears 14T and the sun gear 12T, or a stricture having the planetary gears 14T and the ring gear 16T.

For example, the sun gear 12T may be connected with a member such as a desired shaft (not shown) serving as a rotational center. The sun gear 12T may receive power from an outer side via the shaft (not shown), or may apply the power to the outer side.

The planetary gears 14T are circumscribed about and engaged with the sun gear 12T. In the drawing, three planetary gears 14T are illustrated, but the present invention is not limited thereto. The plurality of planetary gears 14T engaged with the sun gear 12T may be arranged. At this time, a revolution center axis of the planetary gears 14T is overlapped with a rotation center axis of the sun gear 12T.

As the ring gear 16T is engaged with the planetary gears 14T, the planetary gears 14T are inscribed about a gear part formed at the ring gear 16T. That is, the planetary gears 14T are inscribed about the ring gear 16T, and the sun gear 12T may be engaged among the plurality of planetary gears 14T. At this time, a rotation center axis of the ring gear 16T is overlapped with the rotation center axis of the sun gear 12T.

In the above description, all of the sun gear 12T and the ring gear 16T are provided in the one gear stage 10T. However, as described above, it is sufficient that only one of the sun gear 12T and the ring gear 16T is provided in the one gear stage 10T. Therefore, one of them may be omitted.

FIGS. 14, 15, 17, and 18 are views illustrating structure of the transmission apparatus 10000 according to the present invention, and FIG. 16 is a view illustrating the structure of the gear stage of the transmission apparatus 10000 according to the present invention.

Hereinafter, the transmission apparatus 10000 in which the plurality of gear stages are provided will be described.

As described above, the sun gear may be provided in each gear stage. Therefore, for example, when one of the gear stages illustrated in FIG. 14 is referred to as a first gear stage 1000 and another gear stage is referred to as a second gear stage 2000, a first sun gear 1100 may be provided in the first gear stage 1000, and a second sun gear 2100 may be provided in the second gear stage 2000. Meanwhile, as described above, each gear stage may be referred to as the gear set forming one row. This may be applied to all of N gear stages, i.e., each gear set corresponding to N rows, when the transmission apparatus according to the present invention is a compound planetary gear set having N rows having N gear stages.

For example, each of the first and second sun gears 1100 and 2100 may be connected with a member such as a desired shaft (not shown) serving as a rotational center, and may receive power from an outer side via the shaft (not shown), or may apply the power to the outer side, or may receive a braking force by a brake member 4000. At this time, a rotational axis of the second sun gear 2100 and a rotational axis of the first sun gear 1100 are independently formed and disposed to be overlapped with each other. That is, each sun gear included in the plurality of gear stages is coaxially arranged and has a separate shaft. Therefore, the brake may act on only one sun gear, and each sun gear may have a different angular speed from each other.

For example, as illustrated in RIG. 14, there may be provided a double rotary shaft structure in which a hollow portion is formed in a rotary shaft of the second sun gear 2100 and a rotary shaft of the first sun gear 1100 is disposed in the hollow portion.

Preferably, the first and second sun gears 1100 and 2100 may have different diameters from each other. This may be applied to each of N gear stages, when the transmission apparatus according to the present invention has the N gear stages. That is, the sun gears provided at the N gear stages may have different diameters from each other. Therefore, diameters of the planetary gears engaged with each sun gear and a diameter of the ring gear may be different, and the change of speed may be achieved by selectively applying of the brake. This will be described later.

As described above, the planetary gears are provided at each gear stage. Therefore, for example, first planetary gears 1200 are provided in the first gear stage 1000, and second planetary gears 2200 are provided in the second gear stage 2000. This may be applied to all of N gear stages, i.e., each gear set corresponding to N rows, when the transmission apparatus according to the present invention is a compound planetary gear set having N rows each having N gear stages.

The first planetary gears 1200 are engaged with the first sun gear 1100 to be rotated according to a rotation of the first sun gear 1100.

The second planetary gears 2200 share the rotational axes with the first planetary gears 1200, and form a concentric circle. That is, the number of the second planetary gears 2200 is the same as that of the first planetary gears 1200, and each first planetary gear 1200 and each second planetary gear 2200 share the rotary shaft with each other and form the concentric circle together. Therefore, the first and second planetary gears 1200 and 2200 are rotated together and have the same angular speed. Such a relationship between the planetary gears is equally applied to the first gear stage 1000, the second gear stage 2000, and an N-th gear stage.

In words, each planetary gear included in the plurality of gear stages is disposed to correspond to each other in each gear stage, and the plurality of planetary gears corresponding to each other in each gear stage are integrally formed to form a concentric circle, to have the same angular speed and to be rotated together.

Meanwhile, in FIG. 14, the first and second planetary gears 2200 are in contact and integrally formed with each other, but not limited thereto. The first and second planetary gears 2200 may be connected by a connecting means, such as a desired shaft (not shown) connecting center axes of the first and second planetary gears 2200, to be spaced from each other, but are not limited thereto.

As described above, the ring gear may be provided in each gear stage. Therefore, for example, a first ring gear 1300 may be provided in the first gear stage 1000, and a second ring gear 2300 may be provided in the second gear stage 2000. This may be applied to all of N gear stages, i.e., each gear set corresponding to N rows, when the transmission apparatus according to the present invention is a compound planetary gear set having N rows having N gear stages.

The first ring gear 1300 is engaged with the first planetary gears 1200, and configured to be rotated according to rotation of the first planetary gears 1200. That is, the plurality of first planetary gears 1200 are circumscribed about and engaged with the first sun gear 1100, and the first ring gear 1300 is inscribed about and engaged with the plurality of first planetary gears 1200. At this time, a rotation center axis of the first ring gear 1300 is overlapped with a rotation center axis of the first sun gear 1100.

The second ring gear 2300 is inscribed about and engaged with the second planetary gears 2200. The second ring gear 2300 may be rotated according to rotation of the second planetary gears 2200, and a rotation center axis of the second ring gear 2300 is overlapped with rotation center axes of the sun gear and the first ring gear 1300.

Meanwhile, in the drawing, as the number of rows is increased from a first row to an N-th row, a diameter of the sun gear is gradually increased, and diameters of the planetary gears and the ring gear are gradually reduced. That is, diameters of the plurality of sun gears included in the plurality of rows are different from each other. According to one example, the plurality of sun gears may be arranged so that the diameters thereof are increased or reduced.

As the row is changed as described above, when the gear diameters are continuously increased or reduced, it may be easy to design a rotating/fixing mechanism of the sun gear or the ring gear. However, this is not an essential factor in operating the transmission apparatus.

Hereinafter, a cage 3000 will be described.

The cage 3000 supports a rotational axis of each planetary gear. For example, the first and second planetary gears 1200 and 2200 have desired shafts forming the rotational axes, and holes in which the shafts are rotatably inserted may be formed at the cage 3000.

Meanwhile, the cage 3000 may be provided above and under the entire gear stages so as to support the rotational axes of the planetary gears above or under the entire planetary gears.

The cage 3000 has its own rotational axis, and the rotational axes of the sun gear, the ring gear, and the cage 3000 are overlapped with each other.

The cage 3000 is configured to have the rotational axis overlapped with the rotational axis of the sun gear and to support the rotational axes of the planetary gears. Therefore, when the planetary gears are revolved about the sun gear, the shafts serving as the rotational axes of the planetary gears are revolved about the sun gear, and thus the cage 3000 may be rotated in the same direction as a revolution direction thereof.

Meanwhile, on the contrary, the planetary gears may be revolved about the sun gear according to the rotation of the cage 3000.

Hereinafter, the brake member 4000 will be described.

The brake member 4000 capable of controlling and stopping the rotation of each element may be provided. Specifically, the brake member 4000 may be a desired friction brake or a desired gear brake. The brake member 4000 has a desired shape and configuration to apply a braking force to the sun gear, the ring gear, and the cage 3000.

As one example, when the brake member 4000 is the gear brake, a first, gear part may be formed at the gear brake, and a second gear part engaged with the first gear part may be formed at at least part of the shaft of the sun gear, the ring gear, and the cage 3000.

The gear brake may include a rack gear 4100 having the gear part, a spring 4200 exerting an elastic force to the rack gear 4100, a guide rail 4300 guiding a displacement of the rack gear 4100, a rotary shaft 4400 serving as a rotation center of the guide rail 4300, and a power part 4700 displacing the rack gear 4100.

Figure 18:
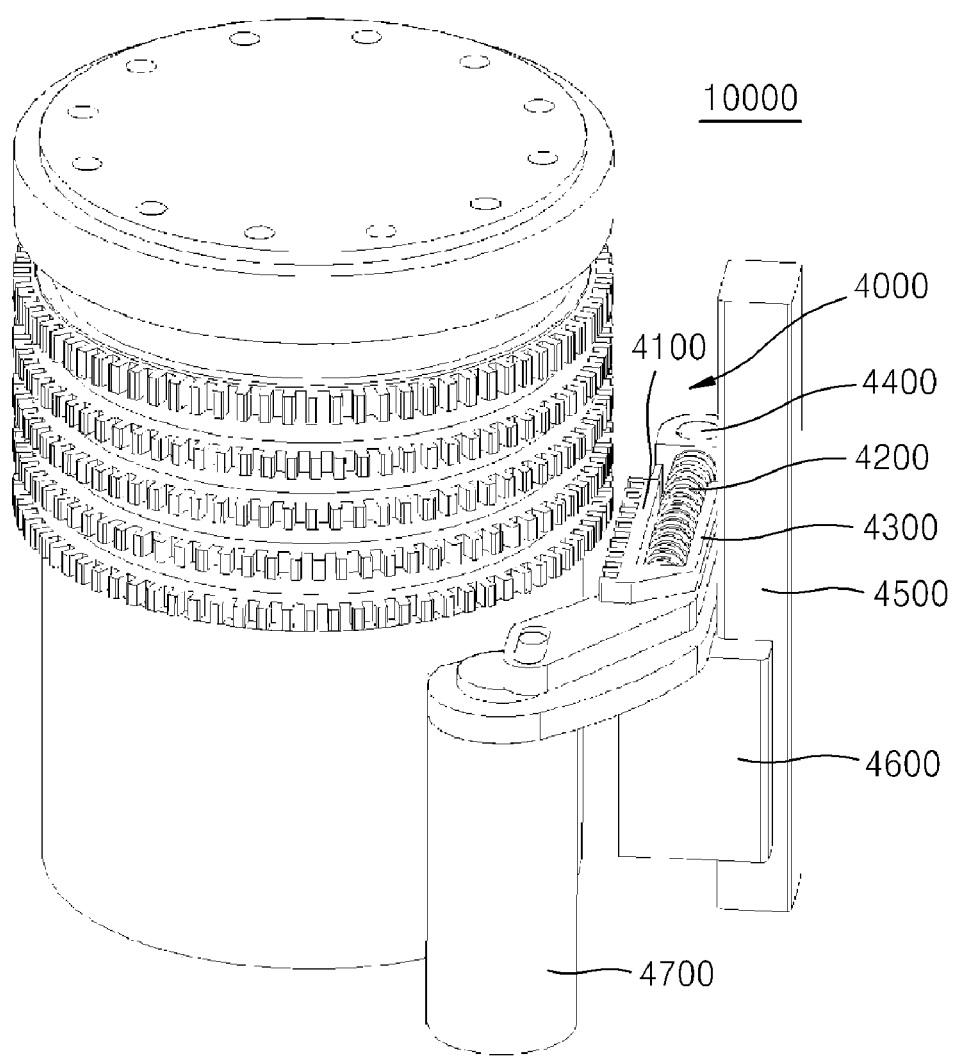
FIG. 18 is a view of the transmission apparatus according to one embodiment of the present invention.

For example, as illustrated in FIG. 18, when stopping a rotary shaft other than an input shaft and an output shaft through the gear brake, the power part displaces the rack gear 4100 such that a gear part of the rack gear 4100 is engaged with a gear part formed around the rotary shaft other than the input and output shafts. At this time, as the rack gear 4100 is guided along the guide rail 4300, an engagement between the rack gear 4100 and the gear brake may be achieved. Meanwhile, since the gear brake includes the spring 4200 exerting the elastic force to the rack gear 4100, a shock generated when the gear part formed at the rack gear 4100 is engaged with the gear part formed at the rotary shaft other than the input and output shafts and thus the rotation is stopped may be mitigated.

Figure 17:
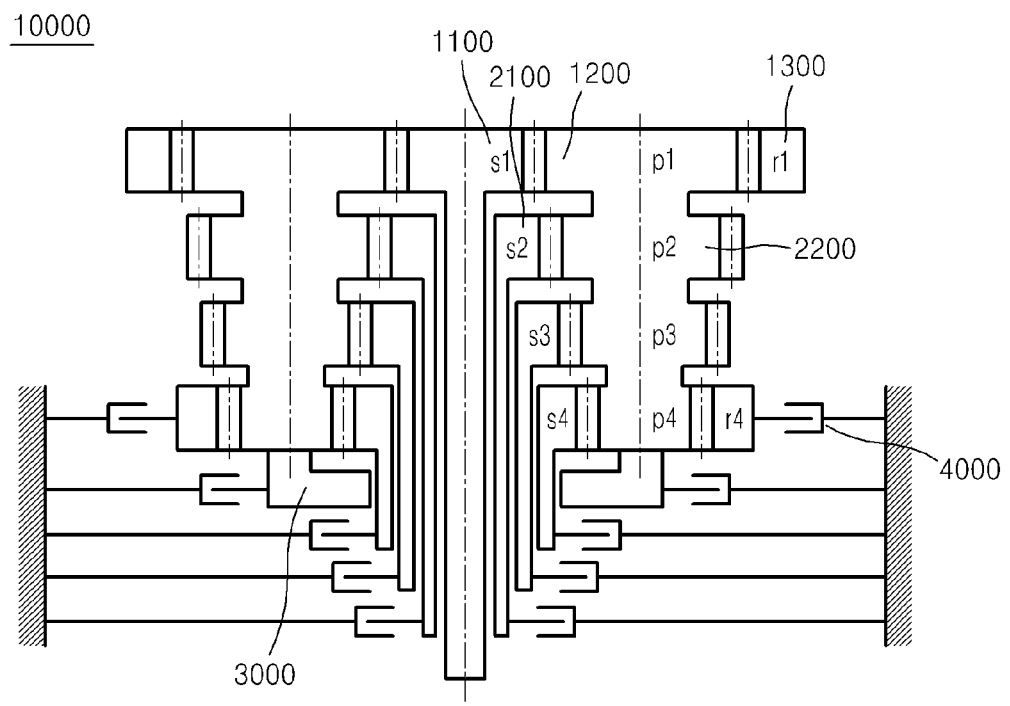
FIG. 17 is a view of the transmission apparatus according to one embodiment of the present invention.

Meanwhile, when the transmission apparatus 10000 of the present invention includes the plurality of gear stages according to the embodiment, for example, as illustrated in FIG. 14, the brake member 4000 may be separately provided at the sun gear shaft, the cage 3000, and the ring gear. However, as illustrated in FIG. 17, the brake member 4000 may be provided at only part of the plurality of sun gears shafts, the cage 3000, and the ring gear. Otherwise, as illustrated in FIG. 18, the brake member 4000 may be displaced and selectively applied to the sun gear shaft, the cage 3000, and the ring gear. That is, as the brake member 4000 is displaced, the brake may be applied to other rotary shaft except the input and output shafts. At this time, the rotary shaft to which the brake is applied may be one, or two or more.

At this time, in order for one gear brake to be properly operated, the brake may be a variable brake having a desired position changeable unit.

For example, as illustrated in FIG. 14, when the brake member 4000 is the gear brake including the rack gear 4100 and has a structure in which the gear stages are stacked up and down in the multi-stage manner, a desired transporting unit displacing the rack gear 4100 such that the rack gear 4100 is displaced and properly engaged with the element to which the brake is applied may be provided.

For example, as illustrated in FIG. 18, the brake member 4000 including the rack gear 4100 is installed at a linear motor driving pact 4600 to be properly displaced along a linear motor fixing part 4500 in a stacking direction of the gear stage, and thus the brake may be properly applied through the rack gear 4100.

At this time, as an example, when the brake member 4000 is applied to only the ring gear, the rotation of the ring gear is stopped, but the rotation of the cage 3000 is not stopped, and thus the revolution of the planetary gears are not interrupted, and the rotation and the revolution thereof may be performed at the same time.

As another example, when the brake member 4000 is applied to only the cage 3000, the rotation of the cage 3000 is stopped, and the revolution of the planetary gears are stopped, and thus only the rotation thereof may be performed.

Hereinafter, an operation of the transmission apparatus 10000 according to the present invention will be described.

Here, for convenience of explanation, the gear stage disposed at one end of the transmission apparatus 10000 according to the present invention is defined as a first row, and another gear stage arranged n-thly from the first row in turn is defined as an n-th row.

In the transmission apparatus 10000 configured with N-row gear stages 10T including N gear stages 10T, an equation of motion applied to a certain n-th row gear stage 10T including a sun gear 12T, a ring gear 16T, and planetary gears 14T can be expressed by the following equations (1) and (2).

$$-w_{sn}D_{sn} = w_p\left(\frac{D_{rn} - D_{sn}}{2}\right) - w_c D_{sn} \tag{1}$$

$$w_{rn}D_{rn} = w_p\left(\frac{D_{rn} - D_{sn}}{2}\right) + w_c D_{rn} \tag{2}$$

wherein $w_{sn}$ is an angular speed of an n-th row sun gear 12T, $w_{rn}$ is an angular speed of an n-th row ring gear 16T, $w_p$ is an angular speed of an n-th row planetary gear 14T (all-row planetary gears 14T are coupled with the same shaft and thus have the same angular speed), $w_c$ is an angular speed of a cage of the planetary gear 14T, $D_{sn}$ is a diameter of the n-th row sun gear 12T, and $D_{rn}$ is a diameter of the n-th row ring gear 16T (each diameter of planetary gears may be indicated by the diameter of the n-th row sun gear 12T and the diameter of the n-th row ring gear 16T ($D_{rn}-D_{sn}/2$)).

In the case of the transmission apparatus 10000 configured with one gear stage 10T (N=1), two equations (equations (3) and (4)) indicating relationships among four angular speeds ($w_{sn}$, $w_{rn}$, $w_p$, and $w_c$) are provided, and when two of the four angular speeds are determined, the rest two angular speeds may be found. That is, if one rotary shaft is fixed (w=0), and another rotary shaft is used as the input shaft, an input rotational speed is known, the two angular speeds of the rest two rotary shafts are determined, and this corresponds to the operation of a general transmission apparatus 10000.

$$-w_{s1}D_{s1} = w_p\left(\frac{D_{r1} - D_{s1}}{2}\right) - w_c D_{s1} \tag{3}$$

$$w_{r1}D_{r1} = w_p\left(\frac{D_{r1} - D_{s1}}{2}\right) + w_c D_{r1} \tag{4}$$

In the case of the transmission apparatus 10000 configured with two gear stages 10T (N=2), four equations (equations (3) to (6)) indicating relationships among six angular speeds ($w_p$, $w_c$, $w_{s1}$, $w_{s2}$, $w_{r1}$, and $w_{r2}$) are provided, and when two of the six angular speeds are determined, the rest four angular speeds may be found.

$$-w_{s2}D_{s2} = w_p\left(\frac{D_{r2} - D_{s2}}{2}\right) - w_c D_{s2} \tag{5}$$

$$w_{r2}D_{r2} = w_p\left(\frac{D_{r2} - D_{s2}}{2}\right) + w_c D_{r2} \tag{6}$$

Since the angular speed $w_p$ of the planetary gears 14T among the six angular speeds is not a value which is generated at an outer side of the transmission apparatus 10000, but the value which is determined by other values, the transmission apparatus 10000 according to the embodiment has five rotary shafts which may be connected to an outer side and controlled. When one of the five rotary shafts is used as the input shaft, and another one is used as the output shaft, and still another one is fixed not to be rotated, i.e., when one of the five rotary shafts is used as a fixing shaft to which the brake applied, the input shaft and the output shaft are rotated at a constant rate, and the change of speed is achieved.

When considering the number of cases thereof, a branch number in which one of the five rotary shafts may be selected as the input shaft is 5, and a branch number in which one of the rest four rotary shafts may be selected as the output shaft is 4, and a branch number in which one of the rest three rotary shafts may be selected as the fixing shaft is 3, and thus the number of all cases thereof is 60 (5×4×3=60). That is, 60 kinds of speed change may be achieved according to the selected input shaft, output shall, and fixing shaft. When the input and output shafts are determined (the number of cases is 20 (5×4=20)), each case may be used as a 3-stage transmission according to the fixing shaft selected from the rest three shafts.

As described above, the transmission apparatus 10000 according to the present invention includes N gear stages 10T. At this time, since N is a natural number which is greater than 1, the transmission apparatus 10000 according to the present invention may include the gear stages 10T which is extended to three or more. As illustrated in FIG. 14, in the case of the transmission apparatus 10000 configured with three gear stages 10T (N=3), six equations (equations (3) to (8)) indicating relationships among eight angular speeds ($w_p$, $w_c$, $w_{s1}$, $w_{s2}$, $w_{s3}$, $w_{r1}$, $w_{r2}$, and $w_{r3}$) are provided, and when two of the eight angular speeds are determined, the rest six angular speeds may be found.

$$-w_{s3}D_{s3} = w_p\left(\frac{D_{r3} - D_{s3}}{2}\right) - w_c D_{s3} \tag{7}$$

$$w_{r3}D_{r3} = w_p\left(\frac{D_{r3} - D_{s3}}{2}\right) + w_c D_{r3} \tag{8}$$

Since the angular speed $w_p$ of the planetary gears 14T among the eight angular speeds is not a value which is generated at an outer side of the transmission apparatus 10000, but the value which is determined by other values, a compound planetary gear set configured in 3 rows has seven rotary shafts which may be connected to an outer side and controlled.

When one of the seven rotary shafts is used as the input shaft, and another one is used as the output shaft, and still another one is fixed not to be rotated, the input shaft and the output shaft are rotated at a constant rate and the change of speed is achieved. When considering the number of cases thereof, a branch number in which one of the seven rotary shafts may be selected as the input shaft is 7, and a branch number in which one of the rest six rotary shafts may be selected as the output shaft is 6, and a branch number in which one of the rest five rotary shafts may be selected as the fixing shaft is 5, and thus a 5-stage transmission having 42 kinds (7×6=42) of speed change may be embodied.

In the same manner, as illustrated in FIG. 15, the branch number which may be provided by the transmission apparatus 10000 including four gear stages 10T (N=4) is 72 (9×8=72). In each of the cases, the transmission apparatus 10000 serves as a 7-stage transmission. In the same manner, the branch number which may be provided by the transmission apparatus 10000 including five gear stages 10T (N=5) is 110 (11×10=110). In each of the cases, the transmission apparatus 10000 serves as a 9-stage transmission. That is, the branch number in which a compound planetary gear set formed in N rows may be formed as a transmission is 2N(2N+1), and each case operates as a 2N−1 transmission.

As the number of the gear stages 10T is increased, the branch number of the transmission, which may be provided by the transmission apparatus 10000, may be increased.

In embodying the transmission apparatus 10000 including three or more gear stages 10T, the transmission may be classified into 20 kinds, like in Table 8, according to the fixing terminal, the input terminal, and the output terminal selected from the sun gear 12T, the ring gear 16T, and the planetary gear 14T, respectively. In the case of the 20 kinds, a general equation of the reduction gear ratio is derived as shown in Table 9.

TABLE 8

Classification of transmission capable of being embodied from transmission apparatus including three or more gear stages

| Fixing terminal | Input terminal | Output terminal | Class number |
|---|---|---|---|
| Sun gear | Ring gear | Cage | 1 |
| | Cage | Ring gear | 2 |
| | Sun gear A (of a different stage from the fixing terminal) | Sun gear B (of a different stage from the fixing terminal) | 3 |
| | Sun gear (of a different stage from the fixing terminal) | Ring gear | 4 |
| | Ring gear | Sun gear (of a different stage from the fixing terminal) | 5 |
| | Sun gear (of a different stage from the fixing terminal) | Cage | 6 |
| | Cage | Sun gear (of a different stage from the fixing terminal) | 7 |
| | Ring gear A | Ring gear B (of a different stage from the ring gear A) | 8 |
| Ring gear | Sun gear | Cage | 9 |
| | Cage | Sun gear | 10 |
| | Ring gear A (of a different stage from the fixing terminal) | Ring gear B (of a different stage from the fixing terminal) | 11 |
| | Ring gear (of a different stage from the fixing terminal) | Sun gear | 12 |
| | Sun gear | Ring gear (of a different stage from the fixing terminal) | 13 |
| | Ring gear (of a different stage from the fixing terminal) | Cage | 14 |
| | Cage | Ring gear (of a different stage from the fixing terminal) | 15 |
| | Sun gear A | Sun gear B (of a different stage from the sun gear A) | 16 |
| Cage | Sun gear A | Sun gear B (of a different stage from the sun gear A) | 17 |
| | Sun gear | Ring gear | 18 |
| | Ring gear | Sun gear | 19 |
| | Ring gear A | Ring gear B (of a different stage from the ring gear A) | 20 |

TABLE 9

General equation of reduction gear ration capable of being embodied from transmission apparatus including three or more gear stages

| General equation of fixing terminal | General equation of reduction gear ratio | Class number |
|---|---|---|
| $w_{sj} = 0$ | $\dfrac{w_{ri}}{w_c} = \dfrac{D_{rf}D_{ri} - D_{sf}D_{si}}{D_{ri}(D_{rf} - D_{sf})}$ | 1 |
| | $\dfrac{w_c}{w_{ro}} = \dfrac{D_{ro}(D_{rf} - D_{sf})}{D_{rf}D_{ro} - D_{sf}D_{so}}$ | 2 |
| | $\dfrac{w_{si}}{w_{so}} = \dfrac{D_{so}(D_{rf}D_{si} - D_{ri}D_{sf})}{D_{si}(D_{rf}D_{so} - D_{ro}D_{sf})}$ | 3 |
| | $\dfrac{w_{si}}{w_{ro}} = \dfrac{D_{ro}(D_{rf}D_{si} - D_{ri}D_{sf})}{D_{si}(D_{rf}D_{ro} - D_{sf}D_{so})}$ | 4 |
| | $\dfrac{w_{ri}}{w_{so}} = \dfrac{D_{so}(D_{rf}D_{ri} - D_{sf}D_{si})}{D_{ri}(D_{rf}D_{so} - D_{ro}D_{sf})}$ | 5 |
| | $\dfrac{w_{si}}{w_c} = \dfrac{D_{rf}D_{si} - D_{ri}D_{sf}}{D_{si}(D_{rf} - D_{sf})}$ | 6 |
| | $\dfrac{w_c}{w_{so}} = \dfrac{D_{so}(D_{rf} - D_{sf})}{D_{rf}D_{so} - D_{ro}D_{sf}}$ | 7 |

TABLE 9-continued

General equation of reduction gear ration capable of being embodied from transmission apparatus including three or more gear stages

| General equation of fixing terminal | General equation of reduction gear ratio | Class number |
|---|---|---|
| | $\dfrac{w_{ri}}{w_{ro}} = \dfrac{D_{ro}(D_{rf}D_{ri} - D_{sf}D_{si})}{D_{ri}(D_{rf}D_{ro} - D_{sf}D_{so})}$ | 8 |
| $w_{rj} = 0$ | $\dfrac{w_{si}}{w_c} = \dfrac{D_{rf}D_{ri} - D_{sf}D_{si}}{D_{si}(D_{rf} - D_{sf})}$ | 9 |
| | $\dfrac{w_c}{w_{so}} = \dfrac{D_{so}(D_{rf} - D_{sf})}{D_{rf}D_{ro} - D_{sf}D_{so}}$ | 10 |
| | $\dfrac{w_{ri}}{w_{ro}} = \dfrac{D_{ro}(D_{rf}D_{si} - D_{ri}D_{sf})}{D_{ri}(D_{rf}D_{so} - D_{ro}D_{sf})}$ | 11 |
| | $\dfrac{w_{ri}}{w_{so}} = \dfrac{D_{so}(D_{rf}D_{si} - D_{ri}D_{sf})}{D_{ri}(D_{rf}D_{ro} - D_{sf}D_{so})}$ | 12 |
| | $\dfrac{w_{si}}{w_{ro}} = \dfrac{D_{ro}(D_{rf}D_{ri} - D_{sf}D_{si})}{D_{si}(D_{rf}D_{so} - D_{ro}D_{sf})}$ | 13 |
| | $\dfrac{w_{ri}}{w_c} = \dfrac{D_{rf}D_{si} - D_{ri}D_{sf}}{D_{ri}(D_{rf} - D_{sf})}$ | 14 |
| | $\dfrac{w_c}{w_{ro}} = \dfrac{D_{ro}(D_{rf} - D_{sf})}{D_{rf}D_{so} - D_{ro}D_{sf}}$ | 15 |
| | $\dfrac{w_{si}}{w_{so}} = \dfrac{D_{so}(D_{rf}D_{ri} - D_{sf}D_{si})}{D_{si}(D_{rf}D_{ro} - D_{sf}D_{so})}$ | 16 |
| $w_c = 0$ | $\dfrac{w_{si}}{w_{so}} = \dfrac{D_{so}(D_{ri} - D_{si})}{D_{si}(D_{ro} - D_{so})}$ | 17 |
| | $\dfrac{w_{si}}{w_{ro}} = \dfrac{D_{ro}(D_{ri} - D_{si})}{D_{si}(D_{ro} - D_{so})}$ | 18 |
| | $\dfrac{w_{ri}}{w_{so}} = -\dfrac{D_{so}(D_{ri} - D_{si})}{D_{ri}(D_{ro} - D_{so})}$ | 19 |
| | $\dfrac{w_{ri}}{w_{ro}} = \dfrac{D_{ro}(D_{ri} - D_{si})}{D_{ri}(D_{ro} - D_{so})}$ | 20 |

The description of symbols used in Table 9 is as follows.

A small letter w is an angular speed and a capital letter D is a diameter of a pitch circle. Also, in subscripts, s is a sun gear 12T, r is a ring gear 16T, c is a cage, n is the number of rows, i is an input, o is an output, and f is an fixing terminal.

In the case in which two subscripts are provided, a left one indicates the sun gear 12T or the ring gear 16T, and a right one indicates the number of rows in the input terminal, the output terminal, or the fixing terminal.

For example, when a second row sun gear 12T is the fixing terminal, a third row ring gear 16T is the input terminal, and a sixth row cage is the output terminal, equations may be derived as follows. Firstly, when the sun gear 12T is the fixing terminal, and the ring gear 16T is the input terminal, and the cage is the output terminal, the class number corresponds to 1. Since the number of rows in the fixing terminal is 2, and the number of rows in the input terminal is 3, and the number of rows in the output terminal is 6, the reduction gear ratio may be expressed as follows.

$$\dfrac{D_{r2}D_{r3} - D_{s2}D_{s3}}{D_{r3}(D_{r2} - D_{s2})} \tag{9}$$

Further, a case in which a fifth row ring gear 16T is the fixing terminal, and a sixth row sun gear 12T is the input terminal, and a first row sun gear 12T is the output terminal (class number 16), the reduction gear ratio is as follows.

$$\dfrac{D_{s1}(D_{r5}D_{r6} - D_{s5}D_{s6})}{D_{s6}(D_{r5}D_{r1} - D_{s5}D_{s1})} \tag{10}$$

As a specific application example, in the case of a reducer using the transmission apparatus 10000 including three gear stages 10T formed in 3 rows, in which the input terminal is the cage and the output terminal is the ring gear 16T having the smallest diameter, this corresponds to the class numbers 2 and 15 in Table 9. In the general equation of the reduction gear ratio in the class number 2, three kinds of reduction gear ratios are determined according to the sun gear 12T to be fixed, and in the general equation of the reduction gear ratio in the class number 15, two kinds of reduction gear ratios are determined according to the ring gear 16T selected from the rest two ring gears 16T except the output terminal to be fixed, and thus total 5 kinds of reduction gear ratios may be embodied.

When considering a relative size between a diameter of the sun gear 12T and a diameter of the pitch circle of the ring gear 16T, it is possible to obtain 5 reduction gear ratios in turn as described below (a first speed has the greatest reduction gear ratio, and a fifth speed has the smallest reduction gear ratio).

$$1st\ speed: \dfrac{w_c}{w_{r3}} = \dfrac{D_{r3}(D_{r2} - D_{s2})}{D_{s3}D_{r2} - D_{s2}D_{r3}} \tag{11}$$

$$2nd\ speed: \dfrac{w_c}{w_{r3}} = \dfrac{D_{r3}(D_{r1} - D_{s1})}{D_{s3}D_{r1} - D_{s1}D_{r3}} \tag{12}$$

$$3rd\ speed: \dfrac{w_c}{w_{r3}} = \dfrac{D_{r3}(D_{r1} - D_{s1})}{D_{r3}D_{r1} - D_{s3}D_{s1}} \tag{13}$$

$$4th\ speed: \dfrac{w_c}{w_{r3}} = \dfrac{D_{r3}(D_{r2} - D_{s2})}{D_{r2}D_{r3} - D_{s2}D_{s3}} \tag{14}$$

$$5th\ speed: \dfrac{w_c}{w_{r3}} = \dfrac{D_{r3}(D_{r3} - D_{s3})}{D_{r3}D_{r3} - D_{s3}D_{s3}} \tag{15}$$

When the diameter of the gear is provided, the reduction gear ratio may be found through equations (11) to (15).

For example, when Ds1=12, Ds2=30, Ds3=33, Dr1=60, Dr2=42, and Dr3=39, the reduction gear ratio in each stage is as follows.

A first speed is 2.167, a second speed is 1.238, a third speed is 0.963, a fourth speed is 0.722, and a fifth speed is 0.542, and a first speed/second speed is 1.75, a second speed/third speed is 1.29, a third speed/fourth speed is 1.33, and a fourth speed/fifth speed is 1.33.

When the transmission apparatus is used as a transmission of a bicycle, the reduction gear ratio is the greatest in the first speed (which is used when driving on a steep slope), and the reduction gear ratio in other stage is reduced at a relatively constant rate, and thus the transmission apparatus may have very preferable performance as the bicycle transmission. An entire speed change ratio (first speed/fourth speed) is 4, and this ratio is greater than that of an existing 10-stage bicycle transmission, and thus the change of speed may be performed within a wider range.

Whether speed change characteristics may be desirably determined will be considered as described below. In the transmission, it is preferable to arbitrarily set an absolute reduction gear ratio (an angular speed ratio between the input shaft and the output shaft is 0) in each stage, which is changed in the transmission, but a ratio (reduction gear ratio in an nth stage/reduction gear ratio in an (n+1)th stage) of reduction gear ratio in each stage may be freely set. In the equations (11) to (15), assuming that a ratio of reduction gear ratio between the first speed and the second speed is k1, and the ratio of reduction gear ratio between the second speed and the third speed is k2, and the ratio of reduction gear ratio between the third speed and the fourth speed is k3, and the ratio of reduction gear ratio between the fourth speed and the fifth speed is k4, it may be expressed as follows.

$$\frac{D_{r3}(D_{r2} - D_{s2})}{D_{s3}D_{r2} - D_{s2}D_{r3}} = k_1 \frac{D_{r3}(D_{r1} - D_{s1})}{D_{s3}D_{r1} - D_{s1}D_{r3}} \quad (16)$$

$$\frac{D_{r3}(D_{r1} - D_{s1})}{D_{s3}D_{r1} - D_{s1}D_{r3}} = k_2 \frac{D_{r3}(D_{r1} - D_{s1})}{D_{r3}D_{r1} - D_{s3}D_{s1}} \quad (17)$$

$$\frac{D_{r3}(D_{r1} - D_{s1})}{D_{r3}D_{r1} - D_{s3}D_{s1}} = k_3 \frac{D_{r3}(D_{r2} - D_{s2})}{D_{r2}D_{r3} - D_{s2}D_{s3}} \quad (18)$$

$$\frac{D_{r3}(D_{r2} - D_{s2})}{D_{r2}D_{r3} - D_{s2}D_{s3}} = k_4 \frac{D_{r3}(D_{r3} - D_{s3})}{(D_{r3})^2 - (D_{s3})^2} \quad (19)$$

In the equations (16) to (19), variables k1, k2, k3, and k4 are predetermined values according to the desired speed change characteristics, and there are six variables which should be found. However, two of the six variables are dependent variables according to a geometrical relationship of a diameter of each gear pitch circle. For example, $D_{r2}$ and $D_{r3}$ may be expressed by the other four variables, like in the equations (20) and (21).

$$D_{r2} = D_{s1} + D_{r1} - D_{s2} \quad (20)$$

$$D_{r3} = D_{x1} + D_{r1} - D_{x3} \quad (21O)$$

Therefore, the equations (16) to (19) may be expressed by the four variables $D_{s1}$, $D_{s2}$, $D_{s3}$, and $D_{r1}$. However, in the case of the reducer, the reduction gear ratio is constant, even though diameters of all gears forming the reducer are increased or reduced at the same rate, and thus the number of independent values is reduced by one. Therefore, the equations (16) and (19) are expressed by three independent variables (e.g., $$\frac{D_{s2}}{D_{s1}}, \frac{D_{s3}}{D_{s1}}, \frac{D_{r1}}{D_{s1}}).$$

Since the independent variables are three, and the equations to be satisfied are four (the equations (16) to (19)), the equations (16) to (19) do not have the values except for a special case. Therefore, the ratio of reduction gear ratio may not be desirably set in the transmission apparatus 10000 formed in three rows, unlike the transmission apparatus 10000 formed in two rows. (since the compound planetary gear set has two independent variables $$\left(\frac{D_{s2}}{D_{s1}}, \frac{D_{r1}}{D_{s1}}\right)$$

and two equations to be satisfied, it is possible to have the values).

However, if only three equations, instead of all equations (16) to (19), are satisfied, since the independent values are three, there are values in the majority of cases, and the ratio of reduction gear ratio in each stage may be desirably set. That is, if the transmission apparatus 10000 formed in three rows is used as a 4-stage transmission instead of a 5-stage transmission, the ratio of reduction gear ratio in each stage may be desirably set.

In the same manner, since the compound planetary gear set formed in four rows has four independent values (e.g., $$\frac{D_{s2}}{D_{s1}}, \frac{D_{s3}}{D_{s1}}, \frac{D_{s4}}{D_{s1}}, \frac{D_{r1}}{D_{s1}})$$

and six relational equations of the reduction gear ratio, the values may not be generally found. In this case, if four of the six relational equations of the reduction gear ratio are satisfied, the values may be found in the majority of cases. Therefore, when the compound planetary gear set formed in four rows is used as the 5-stage transmission, the ratio of reduction gear ratio in each stage may be desirably designed.

In other words, the compound planetary gear set formed in N rows (N≥2) may be used as a maximum 2N−1-stage transmission, but if it is used as an N+1-stage transmission, the ratio of reduction gear ratio in each stage may be desirably designed.

Since the transmission apparatus 10000 according to the present invention includes the compound planetary gear set and the brake mechanism, it is possible to have an uncomplicated and simple structure and to improve use of a space due to a reduced size without an axially extending structure. Further, it is possible to perform a multi-stage variable-speed rotation.

Meanwhile, in one gear stage 10T as described above, it is possible to serve as the transmission apparatus 10000, even when one of the ring gear 16T and the sun gear 12T except the planetary gears 14T is removed. In this case, the removed element corresponds to a state in which the rotary shaft of the removed element is opened, and thus the rotary shaft may be regarded as that the brake is not applied thereto. Therefore, as described above, when it is designed to have a desirable change gear ratio while reducing a changeable gear stage, such a reducer may be embodied.

Further, in the transmission apparatus 10000 according to the embodiment, the output terminal may be in a state capable of being freely rotated by opening all of the rotary shafts except the input terminal and the output terminal. If the transmission apparatus is applied to a vehicle, it is possible to embody a state (a neutral gear state of the vehicle) in which the vehicle may be pushed by a person. Further, when the brake is applied to two or more of the rotary shafts except the input and output terminals, the braking force may be applied to the rotation of the output terminal, and thus it may serve as a main brake or a side brake when being applied to the vehicle.

This characteristic has another advantage in embodying break-by-wire. Since the braking force is applied to the output terminal even when the braking force is applied to certain two of the rotary shafts except the input terminal and the output terminal, the vehicle may be stopped by two brakes even when one of the plurality of (three or more) brakes is broken down.

Therefore, stability of the brake may be further enhanced.

Figure 19:
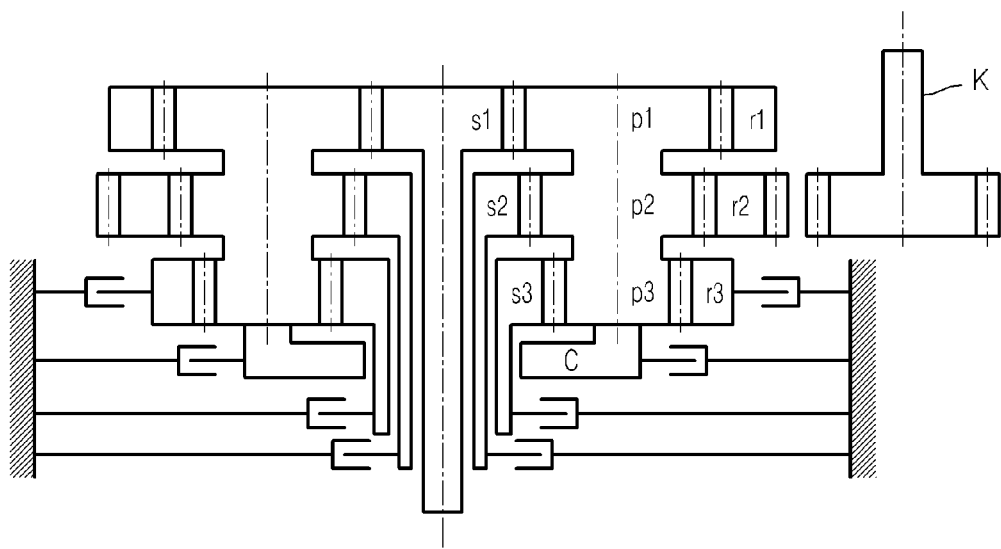
FIG. 19 is a view of the transmission apparatus according to one embodiment of the present invention.

Until now, it has been described that the transmission apparatus of the present invention is used as a transmission apparatus including one input shaft and one output shaft. However, as illustrated in FIG. 19, when another input shaft K is connected to a rotary shaft to which the brake member is applied, and this additional input shaft K is opened or stopped, the transmission apparatus of the present invention may be used as the reducer having the above-mentioned reduction gear ratio. Even when the additional input shaft K is rotated, and a speed of the output shaft is determined by a rotational speed of the two input shafts K, an angular speed w of the rotary shaft corresponding to the brake shaft is not 0 in the equations (1) to (8), and has a certain value. Of course, this is included in the scope of the invention.

That is, the transmission apparatus of the present invention may further include a second input shaft acting on one or more of the rest rotary shafts except the rotary shaft serving as the input and output terminals, and as the second input shaft is rotated at a desired angular speed, the speed of the output shaft may be changed.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A transmission apparatus which changes speed between an input terminal and an output terminal, comprising:
   a sun gear connected to the input terminal;
   a plurality of first planetary gears circumscribed and engaged with the sun gear;
   a plurality of second planetary gears, each second planetary gear configured to combine with each first planetary gear and share rotary shafts with each of the first planetary gears;
   a first ring gear circumscribed and engaged with the first planetary gears and connected to an output shaft;
   a second ring gear circumscribed and engaged with the second planetary gear;
   a cage configured to support the rotary shafts of the first and second planetary gears such that the first planetary gears and the second planetary gears are revolved about the sun gear; and
   first and second brake members,
   wherein the first and second brake members act on the second ring gear and on the cage so as to control rotation of the second ring gear and rotation of the cage.

2. The transmission apparatus of claim 1, wherein a diameter of the first planetary gear is larger than that of the second planetary gear.

3. The transmission apparatus of claim 2, wherein the first brake member is configured to act on the second ring gear and the second brake member is configured to act on the cage.

4. The transmission apparatus of claim 2, wherein a sixth gear part is formed on an outer circumferential surface of the second ring gear, and a seventh gear part is formed on an outer circumferential surface of the cage, and
the first brake member has an eighth gear part engaged with the sixth gear part and the second brake member has a ninth gear part engaged with the seventh gear part.

5. The transmission apparatus of claim 4, wherein the first and second brake members comprise
   a rack gear having the eighth or ninth gear part,
   a spring configured to exert an elastic force to the rack gear,
   a guide rail configured to guide a displacement of the rack gear,
   a rotary shaft configured to serve as a rotation center of the guide rail, and
   a power transmission part configured to displace the rack gear.

6. A transmission apparatus which changes speed between an input terminal and an output terminal, comprising:
   a first sun gear;
   a second sun gear having a rotary shaft overlapped with a rotary shaft of the first sun gear;
   a plurality of first planetary gears circumscribed and engaged with the first sun gear;
   a plurality of second planetary gears, each second planetary gear configured to combine with each first planetary gear, and share rotary shafts with each of the first planetary gears, and circumscribed and engaged with the second sun gear;
   a first ring gear circumscribed and engaged with the first planetary gears;
   a second ring gear circumscribed and engaged with the second planetary gear;
   a cage configured to support the rotary shafts of the first and second planetary gears such that the first and second planetary gears and are revolved about the first and second sun gears; and
   a brake member,
   wherein one of the rotary shaft of the first sun gear, the rotary shaft of the second sun gear, the rotary shaft of the first ring gear, the rotary shaft of the second ring gear, and the rotary shaft of the cage is the input terminal, and another one is the output terminal, and the brake member acts on one or more of three rotary shafts except the input terminal and the output terminal so as to perform a gear changing operation, a gear stopping operation, and a neutral gear operation.

7. The transmission apparatus of claim 6, wherein a diameter of the first sun gear is smaller than that of the second sun gear.

8. The transmission apparatus of claim 7, wherein the brake member comprises a first brake member, a second brake member, and a third brake member, and
   each of the first brake member, the second brake member, and the third brake member acts on a respective one of the rotary shaft of the first sun gear, the rotary shaft of the second sun gear, the rotary shaft of the first ring gear, the rotary shaft of the second ring gear, and the rotary shaft of the cage.

9. The transmission apparatus of claim 8, wherein a first gear part is formed at each rotary shaft except the input terminal and the output terminal, and
   at least one of the first brake member, the second brake member, and the third brake member is a gear brake comprising a second gear part engaged with the first gear part to stop rotation of the rotary shaft.

10. The transmission apparatus of claim 9, wherein the gear brake comprises
a rack gear having a gear part,
a spring configured to exert an elastic force to the rack gear,
a guide rail configured to guide a displacement of the rack gear,
a rotary shaft configured to serve as a rotation center of the guide rail, and
a power transmission part configured to displace the rack gear.

11. The transmission apparatus of claim 7, wherein the first sun gear is connected with the input terminal, and one of the second sun gear, the first ring gear, and the second ring gear is connected with the output terminal, or
the second sun gear is connected with the input terminal, and the second sun gear or the cage is connected with the output terminal, or
the first ring gear is connected with the input terminal, and the first sun gear or the cage is connected with the output terminal, or
the second ring gear is connected with the input terminal, and the first sun gear is connected with the output terminal, or
the cage is connected with the input terminal, and the second sun gear or the first ring gear is connected, and thus
when the brake member acts on any of the three rotary shafts except the input terminal and the output terminal, a rotation direction of the output terminal is not changed.

12. The transmission apparatus of claim 7, wherein the first sun gear is connected with the input terminal, and the second ring gear is connected with the output terminal, or
the first ring gear is connected with the input terminal, and the cage is connected with the output terminal, or
the second ring gear is connected with the input terminal, and the first sun gear is connected with the output terminal, or
the cage is connected with the input terminal, and the first ring gear is connected with the output terminal.

13. A transmission apparatus which changes speed between an input terminal and an output terminal, comprising:
N gear stages arranged in a multistage manner (N>2);
a cage; and
a brake member,
wherein each gear stage comprises at least one of a sun gear and a ring gear, and a plurality of planetary gears, and
the sun gear is disposed at a revolution center of the plurality of planetary gears, and the plurality of planetary gears are circumscribed and engaged with the sun gear, and
the plurality of planetary gears are inscribed and engaged with the ring gear, and
each sun gear included in the plurality of gear stages is coaxially disposed to have a separate shaft, and
the cage supports rotary shafts of the planetary gears such that the planetary gears are revolved about the sun gear, and
when one of the rotary shafts of the sun gears, the rotary shafts of the ring gears, and the rotary shaft of the cage s the input terminal, and another one is the output terminal, the brake member acts on one of other rotary shafts except the input terminal and the output terminal so as to change the speed.

14. The transmission apparatus of claim 13, wherein diameters of the plurality of sun gears are different from each other.

15. The transmission apparatus of claim 13, wherein the plurality of sun gears are arranged so that diameters thereof are increased or reduced, in turn, in an arrangement direction of the plurality of gear stages.

16. The transmission apparatus of claim 13, wherein the brake member is a gear brake having a first gear part, and
a second gear part engaged with the first gear part provided at the gear brake is formed at at least part of the cage, the ring gear, and the shaft of the sun gear.

17. The transmission apparatus of claim 16, wherein the brake member comprises
a rack gear having the first gear part,
a spring configured to exert an elastic force to the rack gear,
a guide rail configured to guide a displacement of the rack gear,
a rotary shaft configured to serve as a rotation center of the guide rail, and
a power transmission part configured to displace the rack gear.

18. The transmission apparatus of claim 13, wherein the brake member is a variable brake member configured to act on each gear stage by changing a position thereof.

19. The transmission apparatus of claim 13, wherein, a gear stopping operation is performed according as the brake member is applied to two or more of other rotary shafts except the input terminal and the output terminal, and
a neutral gear operation is performed as the brake member does not act on the rotary shafts.

20. The transmission apparatus of claim 13, further comprising a second input shaft configured to act on one or more of the rotary shafts except the rotary shafts serving as the input terminal and the output terminal,
wherein a speed of an output shaft is varied according as the second input shaft is rotated at a predetermined angular speed.

* * * * *